United States Patent
Okawa et al.

(10) Patent No.: US 8,730,533 B2
(45) Date of Patent: *May 20, 2014

(54) DOCUMENT PHOTOSENSOR OF SURFACE-MOUNTED ELEMENTS

(71) Applicant: Japan Cash Machine Co., Ltd., Osaka (JP)

(72) Inventors: Katsutoshi Okawa, Tokyo (JP); Seiji Asakawa, Tokyo (JP)

(73) Assignee: Japan Cash Machine Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,614

(22) Filed: Mar. 1, 2013

(65) Prior Publication Data

US 2013/0214182 A1    Aug. 22, 2013

Related U.S. Application Data

(63) Continuation of application No. 12/859,383, filed on Aug. 19, 2010, now Pat. No. 8,400,687.

(30) Foreign Application Priority Data

Aug. 19, 2009    (JP) ................... 2009-190537

(51) Int. Cl.
*H04N 1/04*    (2006.01)
*G06K 9/00*    (2006.01)
*G07F 7/04*    (2006.01)
*G06K 9/74*    (2006.01)
*G03B 29/00*    (2006.01)

(52) U.S. Cl.
USPC .......... 358/474; 382/135; 194/207; 194/206; 356/71; 355/29

(58) Field of Classification Search
USPC ................... 358/474; 382/135; 194/207, 206; 356/71; 250/556; 355/29
See application file for complete search history.

(56) References Cited

U.S. PATENT DOCUMENTS 4,811,056 A *  3/1989  Kimura ........................ 355/68
4,891,662 A    1/1990  Noda
(Continued)

FOREIGN PATENT DOCUMENTS

CN    1374625 A    10/2002
CN    2731594 Y    10/2005
(Continued)

OTHER PUBLICATIONS

Supplementary European Search Report for European Application No. 10809741.1 dated Mar. 11, 2013.

(Continued)

*Primary Examiner* — Charlotte M Baker
*Assistant Examiner* — Rury Grisham
(74) *Attorney, Agent, or Firm* — Bachman & LaPointe, P.C.

(57) ABSTRACT

A document photosensor is provided which comprises a substrate 11, 12, a bracket 41, 42 disposed on substrate 11, 12 for forming a light diffusion chamber 53 and a light receiving chamber 58 separated from each other, an LED chip 21, 31 surface-mounted on substrate 11, 12 in light diffusion chamber 53, and a PD chip 37, 38 surface-mounted on substrate 11, 12 in light receiving chamber 58. These chips 21, 37, 31 and 38 are secured at precise locations on a substrate 11 and 12 with accuracy on the order of a few micrometers or less to exactly detect by PD chip 37, 38 a light irradiated from LED chip 21 or 31 after reflection of the light on a bill 50 moved along a passageway 55 to improve validation performance of bill 50.

15 Claims, 22 Drawing Sheets

(56) References Cited

U.S. PATENT DOCUMENTS

| | | | |
|---|---|---|---|
| 5,136,150 A * | 8/1992 | Fukushima et al. | 250/208.1 |
| 5,381,019 A | 1/1995 | Sato | |
| 5,903,339 A | 5/1999 | Levasseur | |
| 7,182,197 B2 | 2/2007 | Nago et al. | |
| 7,242,796 B2 | 7/2007 | Matsui et al. | |
| 7,789,211 B2 | 9/2010 | Uemizo et al. | |
| 8,400,687 B2 * | 3/2013 | Okawa et al. | 358/474 |
| 2002/0092800 A1 | 7/2002 | Philipp et al. | |
| 2003/0015396 A1 | 1/2003 | Mennie | |
| 2006/0037834 A1 | 2/2006 | Nago et al. | |
| 2011/0090485 A1 | 4/2011 | Cronin et al. | |

FOREIGN PATENT DOCUMENTS

| | | |
|---|---|---|
| CN | 1745398 A | 3/2006 |
| EP | 1128337 A1 | 8/2001 |
| EP | 1239423 | 9/2002 |
| EP | 1239423 A2 | 9/2002 |
| EP | 1471472 | 10/2004 |
| EP | 1482456 A2 | 12/2004 |
| JP | 8-180236 | 7/1996 |
| JP | 3037946 | 6/1997 |

OTHER PUBLICATIONS

International Search Report for PCT/JP2010/005130, dated Sep. 14, 2010.

Official Action for Chinese Application No. 201080036440.2 dated Nov. 28, 2013.

* cited by examiner

DOCUMENT PHOTOSENSOR OF SURFACE-MOUNTED ELEMENTS

CROSS-REFERENCE TO RELATED APPLICATIONS

This application is the U.S. Continuation application of Ser. No. 12/859,383, filed Aug. 19, 2010, which claims priority of Japanese Application No. 2009-190537, filed Aug. 19, 2009.

TECHNICAL FIELD

This invention relates to a document photosensor, in particular of surface-mounted elements for detecting a plurality of optical features resulted from lights reflected on a document to improve performance of document validation.

BACKGROUND OF THE INVENTION

FIG. 22 shows a prior art bill validator 100 capable of detecting a plurality of optical features of valuable papers or bills by means of lights penetrating or reflected on bills. Validator 100 comprises a conveyer device 102 for transporting a bill 50 inserted into an inlet 101 along a passageway 55, a sensor device 110 for detecting optical and magnetic features of bill 50 traveling along passageway 55, and a control device 103 for receiving outputs from sensor device 110 to decide authenticity of bill 50 and also forward drive signals to conveyer device 102. A frame 104 comprises upper and lower casings 104a and 104b to accommodate conveyer device 102, sensor device 110 and control device 103 therein.

Not shown in the drawings, however, control device 103 comprises a memory that has previously stored information on patterns of light amount transmitted through and reflected on bill and magnetic pattern of bill, and a central processing unit (CPU) for comparing bill information output from sensor device 110 with stored bill information in the memory to decide kinds of bill 50 and authenticity of bill in accordance with agreement or disagreement between detected and stored information and also to control drive of conveyer device 102. Sensor device 110 comprises an optical sensor 111 for photo-electrically detecting optical features of bill 50 to produce detection signals and a magnetic sensor 112 for magneto-electrically detecting magnetic ink features printed in a predetermined area of bill 50 to produce detection signals. CPU 103 compares detection signals received from optical and magnetic sensors 111, 112 with stored signals in memory to decide authenticity or false of bill 50. When detection signals agree with signals in memory, CPU 103 decides bill 50 as genuine to further drive conveyer device 102, and bill 50 is further moved through an outlet 106 to stow it in a stacking chamber 105. To the contrary, when detection signals do not agree with signals in memory, CPU 103 decides bill 50 as false to drive conveyer device 102 in the adverse direction, and bill 50 is returned to inlet 101. A bill validator of the foregoing type is shown for example in U.S. Pat. No. 7,182,197.

In the bill validator 100 seen in FIG. 23, optical sensor 111 comprises photocouplers made up of light emitting diodes 114 and photo-transistors 115 deployed in the vicinity of and on the opposite sides of passageway 55 and in a vertically spaced relation to each other. Each of light emitting diodes 114 and photo-transistors 115 has a plastic shell 114a, 115a and outer leads or pins 117 extended from plastic shell 114a, 115a to mount them on upper and lower printed circuit boards 116 in frame 104 inserting and fastening pins 117 in through-halls on printed circuit boards 116. Each of light emitting diodes 114 and photo-transistors 115 has a hemi-spherical lens formed at the tip of plastic shell 114a, 115a, and cylindrical lenses 118 are disposed opposite to hemi-spherical lenses of plastic shell 114a, 115a.

Optical sensor devices of this type are shown in for example U.S. Pat. Nos. 5,381,019; 5,903,339; and 7,242,796; and Japanese Utility Model Registration No. 3,037,946.

Such a prior art optical sensor device of the pin-insertion type however is disadvantageous because a plurality of light emitting diodes cannot be mounted in their accurate vertical and horizontal positions on printed circuit boards due to various or diversified shapes of outer leads or uneven or different attachment positions of outer leads in through-holes of printed circuit boards. This results in deviation of a light emission axis of light emitting diodes from a correct optical axis upon attachment on printed circuit boards while impeding an exact and effective detection of optical features from bills because light emitting diodes cannot correctly and precisely irradiate lights on predetermined target points on bill. There is also another defect in the prior art optical sensor device because plastic shell and outer leads extended from plastic shell cause height and thickness in sensor device to undesirably increase. Also, the more number of optical sensing elements is increased to improve detection accuracy of transmitted-light amount pattern, the more the occupation area of sensor device expands, thereby causing bill validator to be made in inconveniently larger size. Moreover, the prior art sensor device necessarily needs cylindrical lenses for light emitting diodes and light receiving transistors in addition to their hemi-spherical lenses. In this case, error in manufacture of sensor device would fluctuate light beams from light emitting diodes, and this may have a bad impact on uniform light beams. In another aspect, the inventors of the present invention firmly believe that one of modern bill validation techniques would pick out multicolored data of lights penetrated through many microscopic areas of a bill and then to precisely decide whether differences or rates between optical outputs in different wavelength are within or out of a predetermined range.

Accordingly, an object of the present invention is to provide a document photosensor capable of detecting a plurality of optical features of a document for improvement in detection performance of light amount patterns reflected on the document. Another object of the present invention is to provide a document photosensor that has less number of light receiving elements capable of receiving lights of different wavelength irradiated from increased number of light emitting elements for improvement in validation performance. Still another object of the present invention is to provide a document photosensor in small size that comprises light emitting and receiving elements disposed at a reduced interval therebetween with the light emitting elements also disposed at a reduced interval therebetween for detecting a plurality of optical features of the document.

SUMMARY OF THE INVENTION

The document photosensor of two optical elements according to the present invention comprises: a substrate (11, 12), a bracket (41, 42) disposed on substrate (11, 12) for forming a light diffusion chamber (53) and a light receiving chamber (58) separated from each other, a light emitting element (21, 31) surface-mounted on substrate (11, 12) in light diffusion chamber (53), and a light receiving element (37, 38) surface-mounted on substrate (11, 12) in light receiving chamber (58).

Light emitting element (21, 22) is turned on to irradiate a light that radiates and spreads in light diffusion chamber (53).

The document photosensor of two optical elements can improve detection performance of light amount pattern permeated through a document as follows:

[1-1] In manufacture of the document photosensor, mounters may be used to sack and hold under vacuum light emitting element (21, 31), to precisely mount it at a predetermined surface location on substrate (11, 12) with accuracy on the order of a few micrometers or less to exactly detect a light reflected on document (50) by light receiving element (37, 38).

[1-2] Light emitting element (21, 31) is a light emitting diode chip surface-mounted on substrate (11, 12) to notably and more reduce thickness and array length of a sensor assembly (1, 2) compared to the prior art structure by pin-insertion technique.

[1-3] Light emitting element (21, 31) is directly secured on substrate (11, 12) without error or deviation in mounting of the element while exactly aligning a light axis of light emitting element (21, 31) unlike the prior art structure by pin-insertion technique.

The document photosensor of three optical elements according to the present invention comprises: a substrate (11, 12), a bracket (41, 42) disposed on substrate (11, 12) for forming a light diffusion chamber (53) and a light receiving chamber (58) separately from each other, first and second light emitting elements (21, 22, 31, 32) surface-mounted on substrate (11, 12) in light diffusion chamber (53), and a light receiving element (37, 38) surface-mounted on substrate (11, 12) in light receiving chamber (58).

The document photosensor of three optical elements can improve detection performance of light amount pattern permeated through a document as follows:

[2-1] In manufacture of the document photosensor, mounters may be used to sack and hold under vacuum first and second light emitting elements (21, 22, 31, 32), to precisely mount them at given surface locations on substrate (11, 12) with accuracy on the order of a few micrometers or less to exactly detect lights reflected on document 50 by light receiving elements (37, 38).

[2-2] Adjoining first and second light emitting elements (21, 22, 31, 32) may be surface-mounted on upper substrate (11) in a spaced distance or with pitch less than 1 mm, preferably less than 0.6 mm. Accordingly, first and second light emitting elements (21, 22, 31, 32) irradiate lights that are reflected on document (50) and then are received by light receiving element (37, 38) while improving detection accuracy in light amount pattern reflected on document (50). However, one of ordinary skill in the art may select different pitch distances between light emitting elements as necessary in view of size of light emitting elements and insulation requirements.

[2-3] All of first and second light emitting elements (21, 22, 31, 32) are light emitting diode chips surface-mounted on substrate (11, 12) to notably and more reduce thickness and array length of sensor assemblies (1, 2) compared to the prior art structure by pin-insertion technique.

[2-4] First and second light emitting elements (21, 22, 31, 32) are directly secured on substrate (11, 12) without error or deviation in mounting of the elements while exactly aligning each light axis of first and second light emitting elements (21, 22, 31, 32) unlike the prior art structure by pin-insertion technique.

[2-5] The document photosensor may comprise increased number of light emitting elements for irradiating lights of different wavelength to detect increased number of light amount patterns reflected on document (50) for more improvement in validation performance while reducing number of light receiving elements for reduction in cost for manufacture compared to the prior art optical sensor.

The document photosensor of four optical elements according to the present invention comprises: a substrate (11, 12), a bracket (41, 42) disposed on substrate (11, 12) for forming a light diffusion chamber (53) and a light receiving chamber (58) separately from each other, first, second and third light emitting elements (21, 22, 23, 31, 32, 33) surface-mounted on substrate (11, 12) in light diffusion chamber (53), and a light receiving element (37, 38) surface-mounted on substrate (11, 12) in light receiving chamber (58).

The document photosensor of four optical elements can improve detection performance of light amount pattern reflected on a document as follows:

[3-1] In manufacture of the document photosensor, mounters may be used to sack and hold under vacuum first to third light emitting elements (21 to 23, 31 to 33) to precisely mount them at predetermined surface locations on substrate (11, 12) with accuracy on the order of a few micrometers or less to exactly detect lights reflected on document 50 by light receiving element (37, 38).

[3-2] Adjoining first and second light emitting elements (21 to 23, 31 to 33) may be surface-mounted on upper substrate (11) in a spaced distance or with pitch less than 1 mm, preferably less than 0.6 mm. Accordingly, adjoining first to third light emitting elements (21 to 23, 31 to 33) irradiate lights that are reflected on document (50) and then are received by light receiving element (37, 38) while improving detection accuracy in light amount pattern reflected on document (50).

[3-3] All of first to third light emitting elements (21 to 23, 31 to 33) are light emitting diode chips surface-mounted on substrate (11, 12) to notably and more reduce thickness and array length of a sensor assembly (1, 2) compared to the prior art structure by pin-insertion technique.

[3-4] First to third light emitting elements (21 to 23, 31 to 33) are directly secured on respectively substrate (11, 12) without error or deviation in mounting of the elements while exactly aligning each light axis of first to third light emitting elements (21 to 23, 31 to 33) unlike the prior art structure by pin-insertion technique.

[3-5] The document photosensor may comprise increased number of light emitting elements for irradiating lights of different wavelength to detect increased number of light amount patterns reflected on document (50) for more improvement in validation performance while reducing number of light receiving elements for reduction in cost for manufacture compared to prior art optical sensor.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Figure 22:
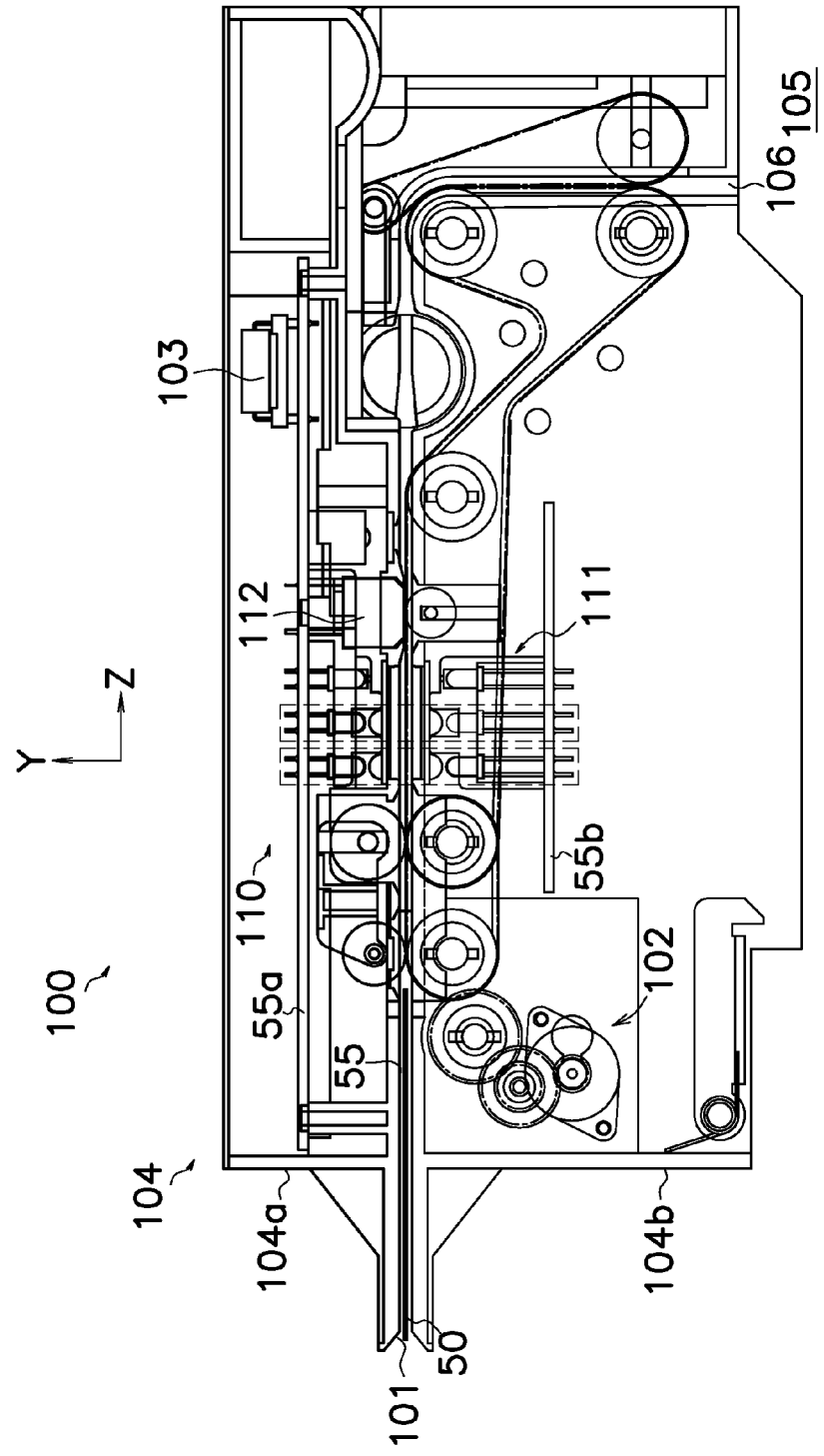
FIG. 22 is a section view of a prior art bill validator.
Figure 23:
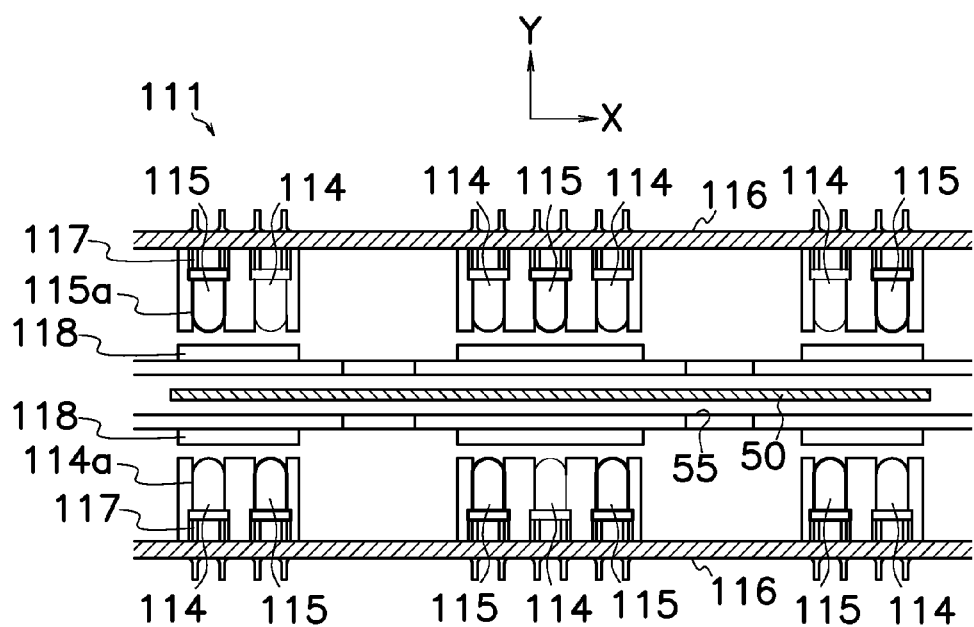
FIG. 23 is a section view of a prior art optical sensing device.

Embodiments of the document photosensor according to the present invention applied to bill validators will be described hereinafter in connection with FIGS. 1 to 21 of the drawings. Same reference symbols as those shown in FIGS. 22 and 23 are applied to similar portions in FIGS. 1 to 21, omitting explanation thereon. Shown coordinate axes X, Y and Z indicate respectively a transverse or lateral direction of passageway 55 or document 50 traveled through passageway 55; a vertical direction along a height of document 50; and a longitudinal or lengthwise direction along a length of document 50 or moved direction of document 50 through passageway 55. A word "document" herein means a valuable paper, a bill, currency, security, coupon, tender, scrip or all other valuable document. A phrase "top" or "upper portion" herein means an upper position along Y axis, and a phrase "bottom" or "lower potion" herein means a lower position along Y axis. An upper X axis upward along Y axis means a first array line 56 along which light emitting and receiving elements shown in FIG. 14 are mounted, and a lower X axis downward along Y axis means a second array line 57. First and second array lines 56 and 57 are in parallel to each other and perpendicular to the lengthwise direction of passageway 55. A wording "aspheric lens" herein is used to condense a light irradiated from a light emitting element in a transverse line toward bill to irradiate a linear light beam on bill, and also to condense the linear light beam on bill toward a light receiving element. To this end, such an aspheric lens is selected from cylindrical lens, partly cylindrical lens, parabolic lens or similar or equivalent lens. Finally, a bracket is used to maintain an aspheric lens in position and to prevent inward incidence of external disturbing light.

FIGS. 1 to 4 illustrate document photosensors 10a and 10b of four optical elements according to the present invention. Photosensor 10a shown in FIGS. 1 and 2 comprises an upper sensor assembly 1 disposed on an upper side of a passageway 55 along which a bill 50 is transported and a lower sensor assembly 2 disposed on the opposite lower side of passageway 55 from upper sensor assembly 1. Upper sensor assembly 1 comprises an upper base plate 13 having a plurality of upper terminals 63 formed on upper base plate 13, an upper substrate 11 mounted on upper base plate 13 and having a plurality of upper conductive leads 61 electrically connected to a plurality of upper terminals 63 formed on upper base plate 13, an upper LED (light emitting diode) chip 21 as an upper light emitting element surface-mounted on upper substrate 11 and having a pair of terminals electrically connected to related ones of upper conductive leads 61, and an upper PD (photo-diode) chip 37 as an upper light receiving element surface-mounted on upper substrate 11 and having a pair of terminals electrically connected to related ones of upper conductive leads 61, an upper bracket 41 disposed on upper substrate 11, and an upper aspheric lens 51 supported on upper bracket 41 opposite to upper LED and PD chips 21 and 37.

Figure 13:
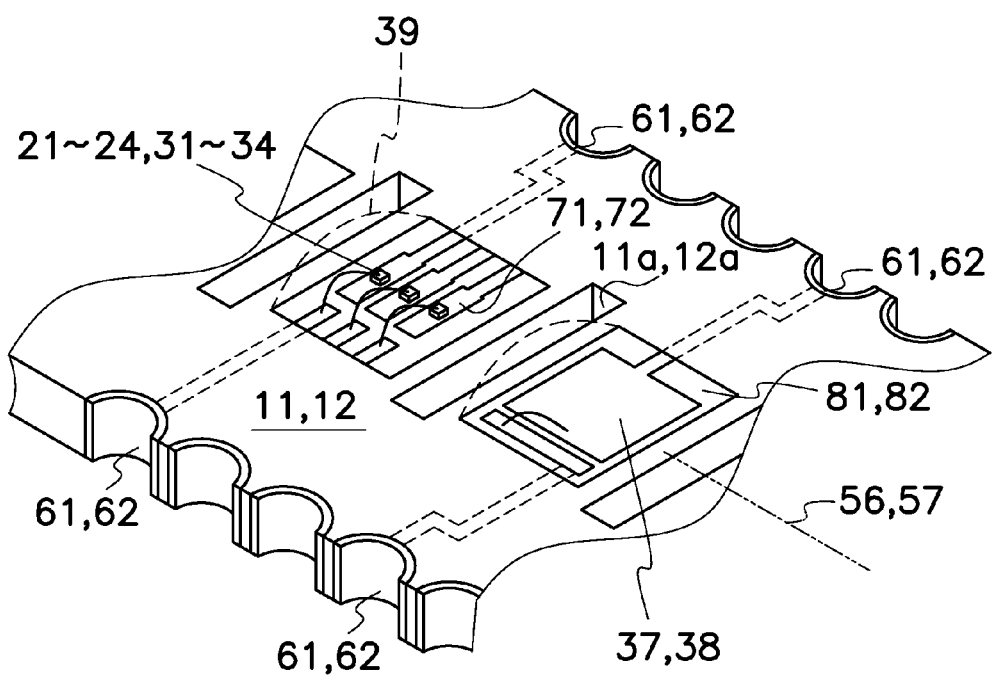
FIG. 13 is a partial perspective view showing a typical arrangement of LED and PD chips mounted on a substrate for use in the present invention.
Figure 14:
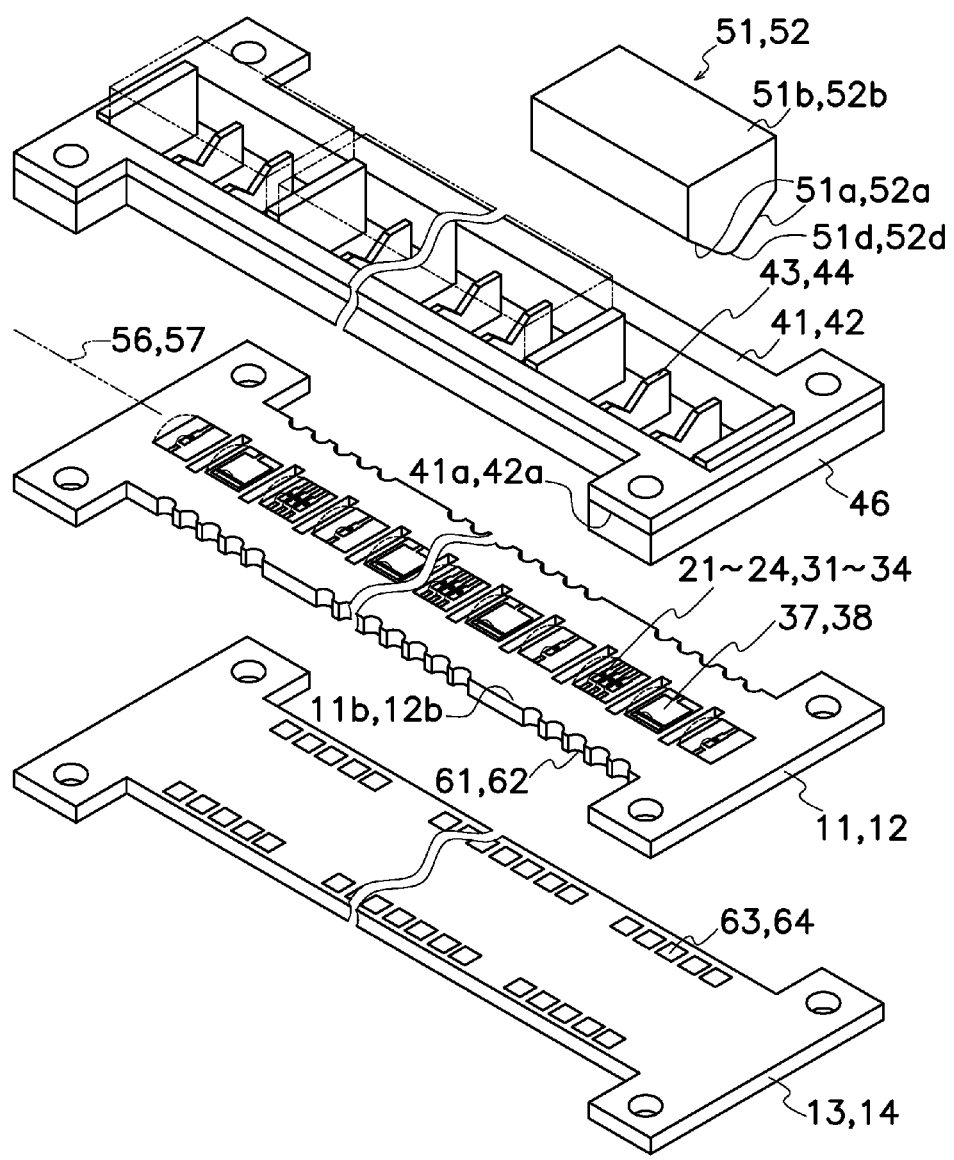
FIG. 14 is a partial perspective view showing a typical arrangement of light emitting and receiving elements mounted on a substrate for use in the present invention.

As seen in FIG. 13, upper LED chip 21 has one terminal secured on and electrically connected to an upper emission electrode 71 formed on upper substrate 11; upper emission electrode 71 is electrically connected to one of upper conductive leads 61; the other terminal of upper LED chip 21 is electrically connected to another upper lead 61 via a golden wire. Upper PD chip 37 has one terminal secured on and electrically connected to an upper acceptance electrode 81 formed on upper substrate 11; upper acceptance electrode 81 is electrically connected to one of upper conductive leads 61; the other terminal of upper PD chip 37 is electrically connected to still another upper lead 61 via a golden wire. Upper emission and acceptance electrodes 71 and 81 are in alignment with first array line 56 normal to the longitudinal direction of passageway 55. A plurality of upper leads 61 on upper substrate 11 are electrically connected to upper terminals 63 on upper base plate 13 by solder or metallic binding material. Upper aspheric lens 51 is secured on an upper bracket 41 opposite to upper LED and PD chips 21 and 37 which are fed electric power through upper leads 61.

Similarly to upper sensor assembly 1, lower sensor assembly 2 comprises a lower base plate 14 having a plurality of lower terminals 64 formed on lower base plate 14, a lower substrate 12 mounted on lower base plate 14 and having a plurality of lower conductive leads 62 electrically connected to a plurality of lower terminals 64 formed on lower base plate 14, a lower LED (light emitting diode) chip 31 as a lower light emitting element surface-mounted on lower substrate 12 and having a pair of terminals electrically connected to related ones of lower conductive leads 62, and a lower PD (photodiode) chip 38 as a lower light receiving element surface-mounted on lower substrate 12 and having a pair of terminals electrically connected to related ones of lower conductive leads 62, a lower bracket 42 disposed on lower substrate 12, and a lower aspheric lens 52 supported on lower bracket 42 opposite to lower LED and PD chips 31 and 38.

As shown in FIG. 13, lower LED chip 31 has one terminal secured on and electrically connected to a lower emission electrode 72 formed on lower substrate 12; lower emission electrode 72 is electrically connected to one of lower conductive leads 62; the other terminal of lower LED chip 31 is electrically connected to another lower lead 62 via a golden wire. Lower PD chip 38 has one terminal secured on and electrically connected to a lower acceptance electrode 82 formed on lower substrate 12; lower acceptance electrode 82 is electrically connected to one of lower conductive leads 62; the other terminal of lower PD chip 38 is electrically connected to still another lower lead 62 via a golden wire. Lower emission and acceptance electrodes 72 and 82 are in alignment with second array line 57 normal to the longitudinal direction of passageway 55. A plurality of lower leads 62 on lower substrate 12 are electrically connected to lower terminals 64 on lower base plate 14 by solder or metallic binding material. Lower aspheric lens 52 is secured on a lower bracket 42 opposite to lower LED and PD chips 31 and 38 which are fed electric power through lower leads 62.

Upper and lower aspheric lenses 51 and 52 serve to respectively convert lights irradiated from upper and lower LED chips 21 and 32 into parallel linear light beams. Upper aspheric lens 51 also functions to focus onto upper PD chip 37 light irradiated from lower LED chip 31 and then penetrated through bill 50, and in a similar manner, lower aspheric lens 52 works to focus on to lower PD chip 38 light irradiated from upper LED chip 21 and penetrated through bill 50. Accordingly, upper and lower light emitting elements 21 and 31 do not require to have their inherent unitized lens.

Upper and lower base plates 13 and 14 are secured to respectively upper and lower walls 55a and 55b to define a passageway 55 in frame 104. Upper and lower brackets 41 and 42 comprise respectively upper and lower partitions 43 and 44 for isolating upper LED and PD chips 21 and 37, and lower LED and PD chips 31 and 38. Formed in upper and lower substrate 11 and 12 are respectively upper and lower openings 11a and 12a in which each end of upper and lower partitions 43 and 44 is fit for secure attachment of upper and lower brackets 41 and 42 in position.

An upper aspheric lens 51 is disposed on upper partition 43 in a spaced relation by a certain distance to upper LED and PD chips 21 and 37, and a lower aspheric lens 52 is disposed on lower partition 44 in a spaced relation by a certain distance to lower LED and PD chips 31 and 38. Upper partition 43 of upper bracket 41 serves to block direct incidence of light from upper LED chip 21 into upper PD chip 37 adjacent to upper LED chip 21 to prevent pseudo-lighting or malfunction of upper PD chip 37. Alike, lower partition 44 of lower bracket 42 serves to block direct incidence of light from lower LED chip 31 into lower PD chip 38 adjacent to lower LED chip 31 to prevent malfunction of lower PD chip 38.

Figure 1:
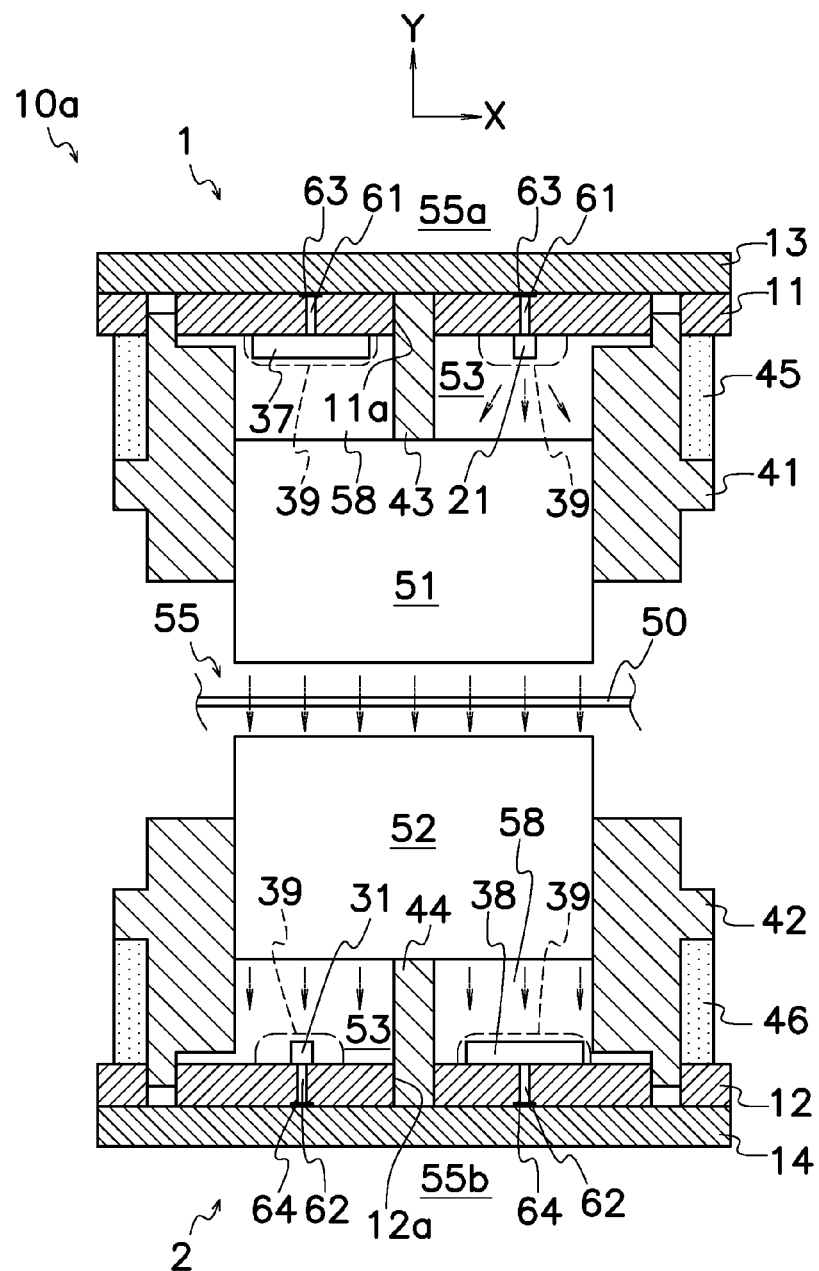
FIG. 1 is a longitudinal section view of a first embodiment of the document photosensor with four optical elements according to the present invention.
Figure 2:
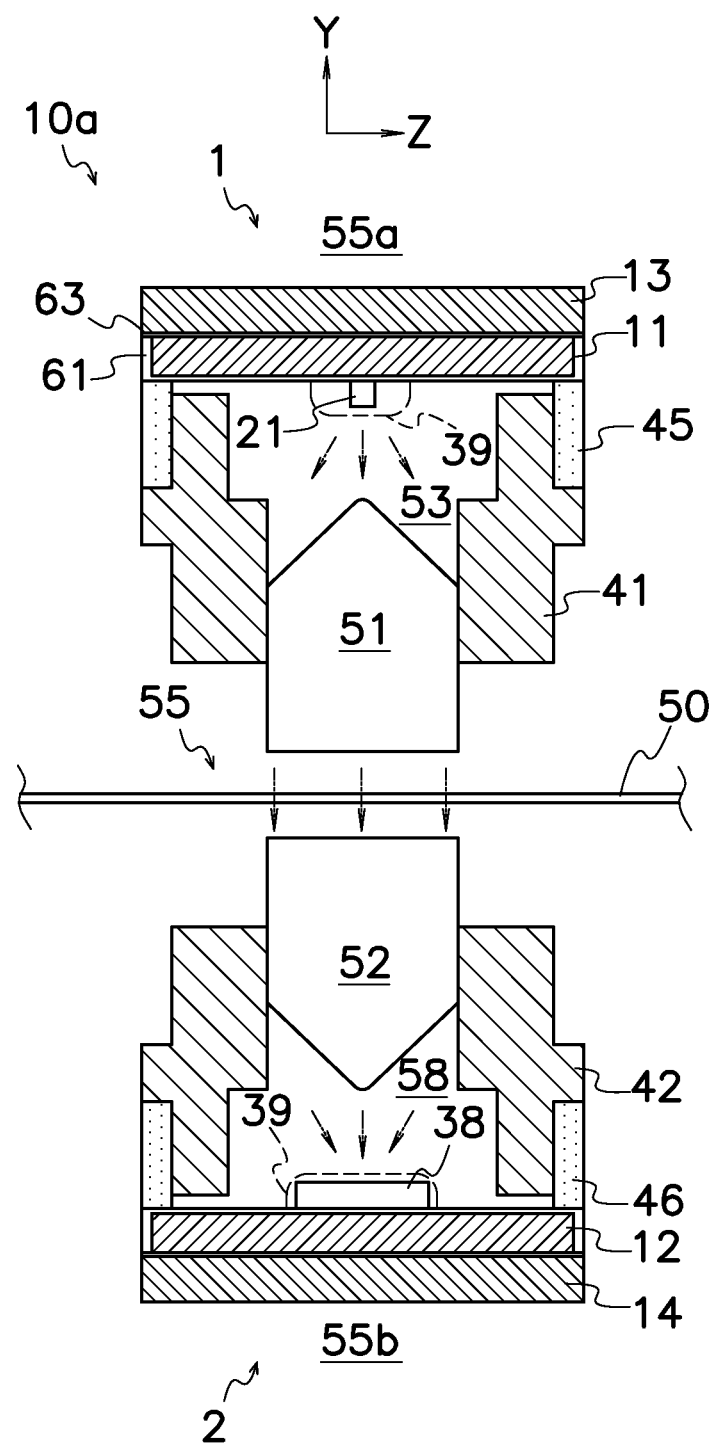
FIG. 2 is a transverse section view of the first embodiment shown in FIG. 1.

In document photosensor 10a shown in FIGS. 1 and 2, upper and lower LED chips 21 and 31 are symmetrically disposed about a central point in passageway 55, and also, upper and lower PD chips 37 and 38 are symmetrically disposed. Upper and lower LED chips 21 and 31 are turned on at different points in time under time division control to prevent simultaneous reception of lights from upper and lower LED chips 21 and 31 by upper and lower PD chips 37 and 38.

Light irradiated from lower LED chip 31 is converted through lower aspheric lens 52 into parallel linear light beams which penetrate bill 50 and then are gathered on upper PD chip 37 through upper aspheric lens 51 to receive gathered beams by upper PD chip 37. Likewise, light irradiated from upper LED chip 21 is converted through upper aspheric lens 51 into parallel linear light beams which penetrate bill 50 and then are gathered on lower PD chip 38 through lower aspheric lens 52 to receive gathered beams by lower PD chip 38. In this case, after upper LED chip 21 is turned off, lower LED chip 31 is turned on, and after lower LED chip 31 is turned off, upper LED chip 21 is turned on.

Figure 3:
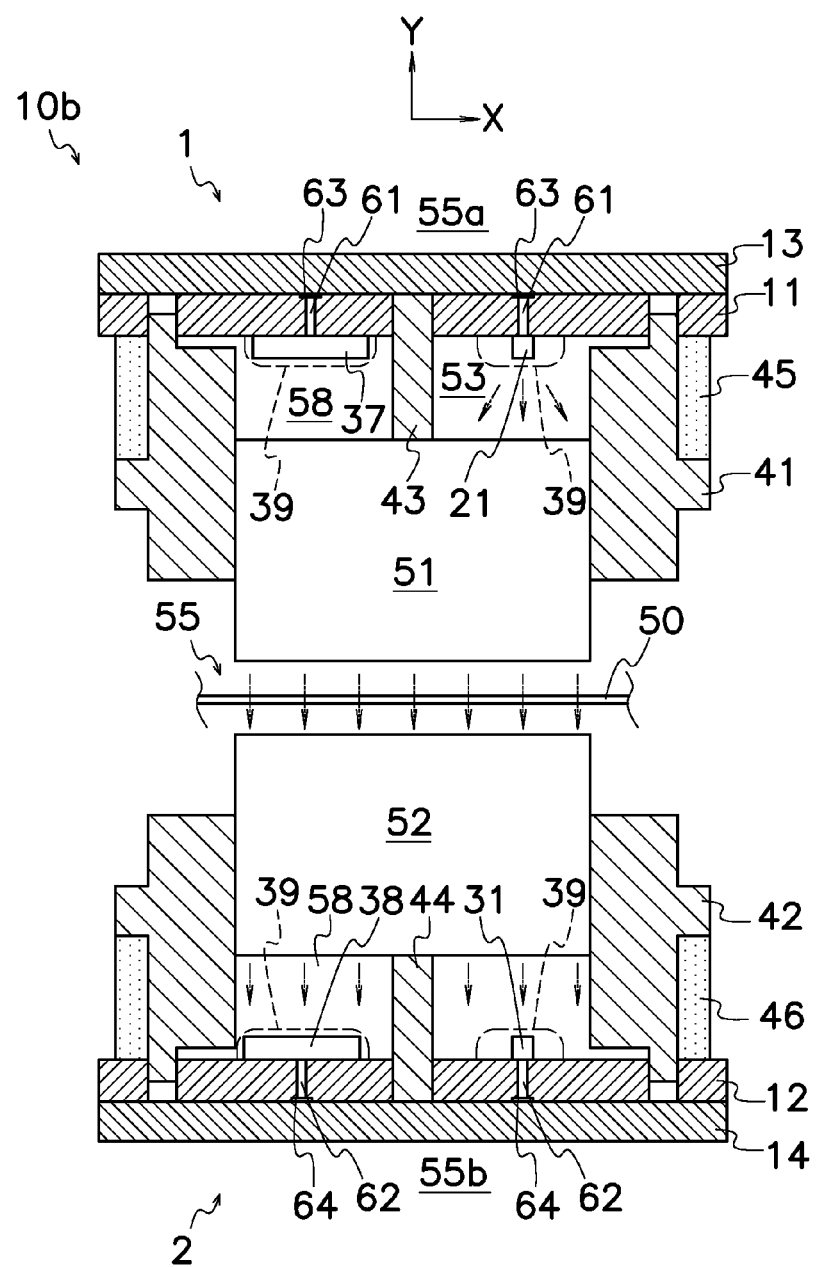
FIG. 3 is a longitudinal section view of a second embodiment of the document photosensor with four optical elements according to the present invention.
Figure 4:
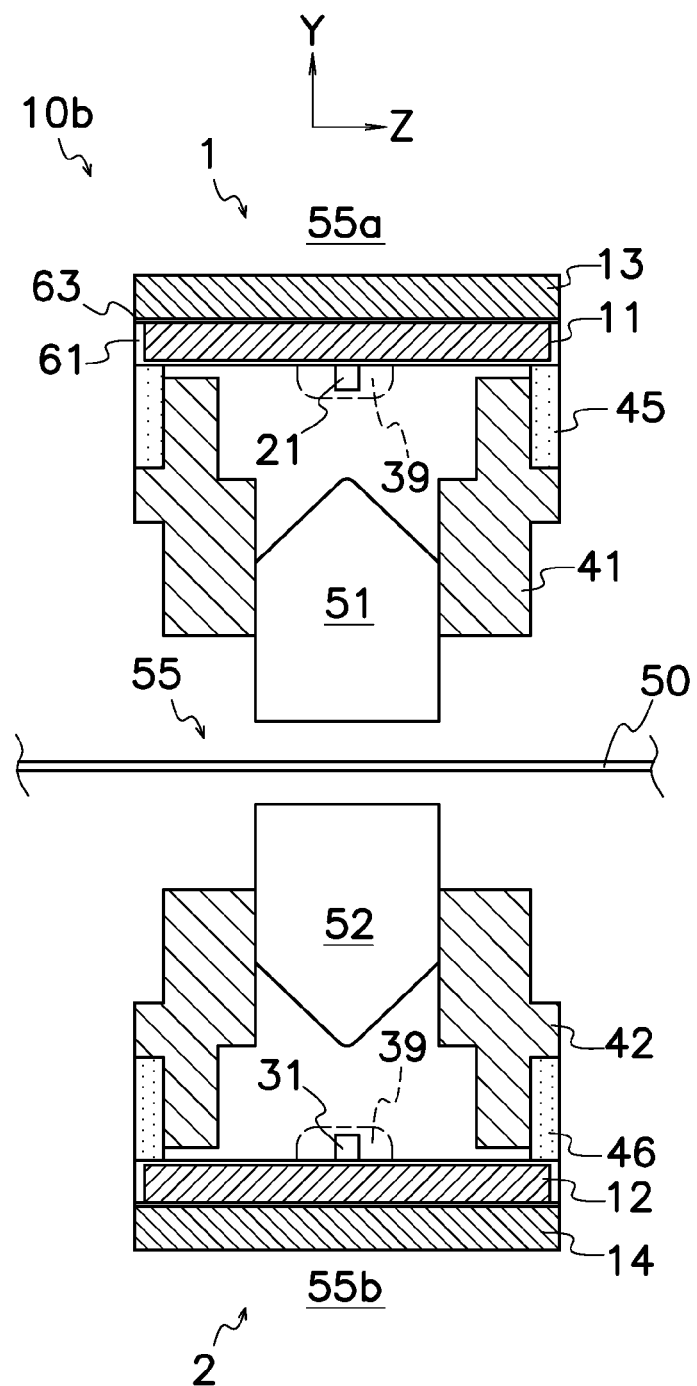
FIG. 4 is a transverse section view of the second embodiment shown in FIG. 3.

In document photosensor 10b shown in FIGS. 3 and 4, upper and lower LED chips 21 and 31 and upper and lower PD chips 37 and 38 are symmetrically disposed about a transversely central axis across passageway 55. In the document photosensors with four optical elements shown in FIGS. 1 to 4, upper and lower LED chips 21 and 31 may irradiate lights of different wavelength to produce light data of two kinds transmitted through bill 50 for decision of bill validity.

Figure 5:
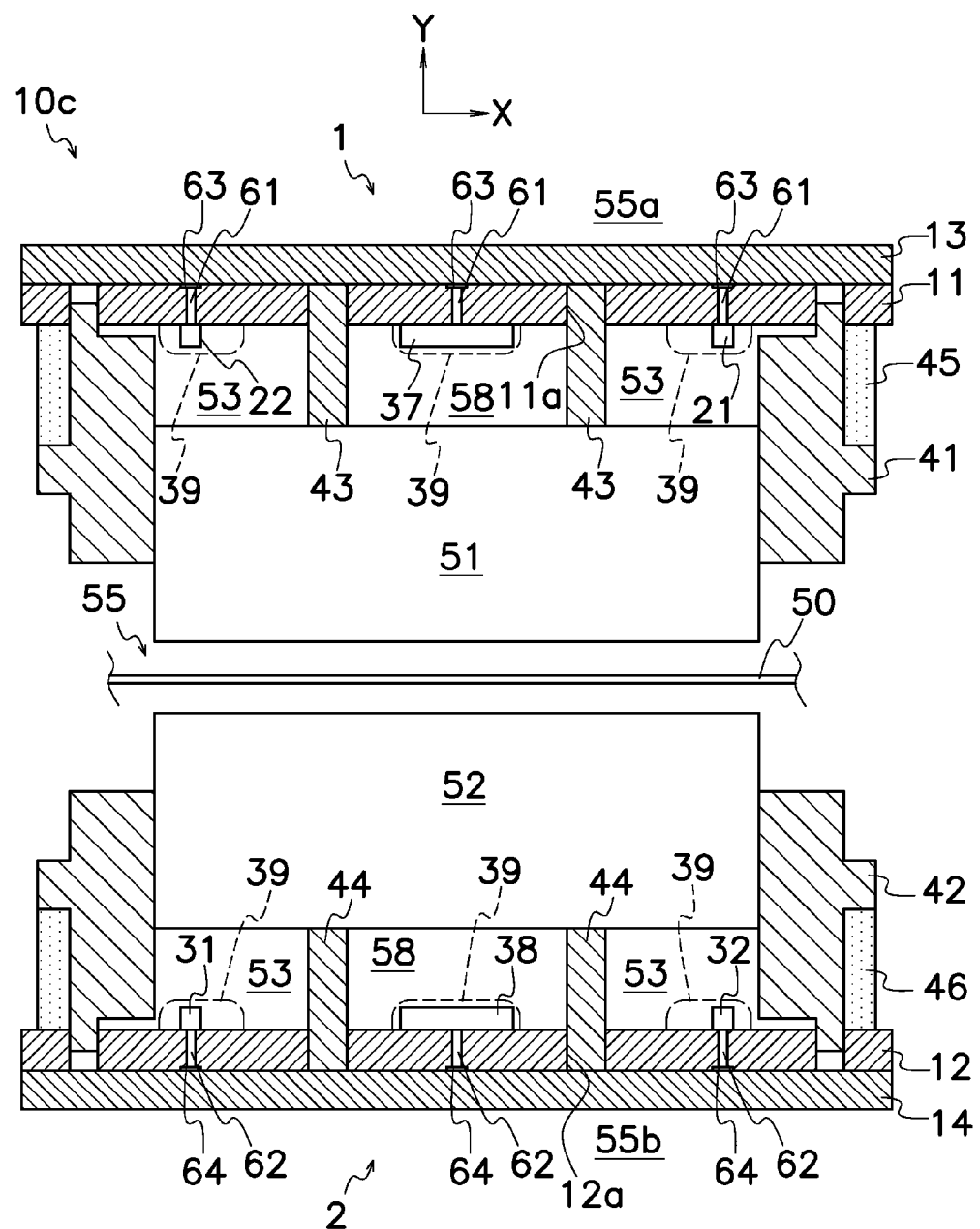
FIG. 5 is a longitudinal section view of a first embodiment of the document photosensor with six optical elements according to the present invention.
Figure 6:
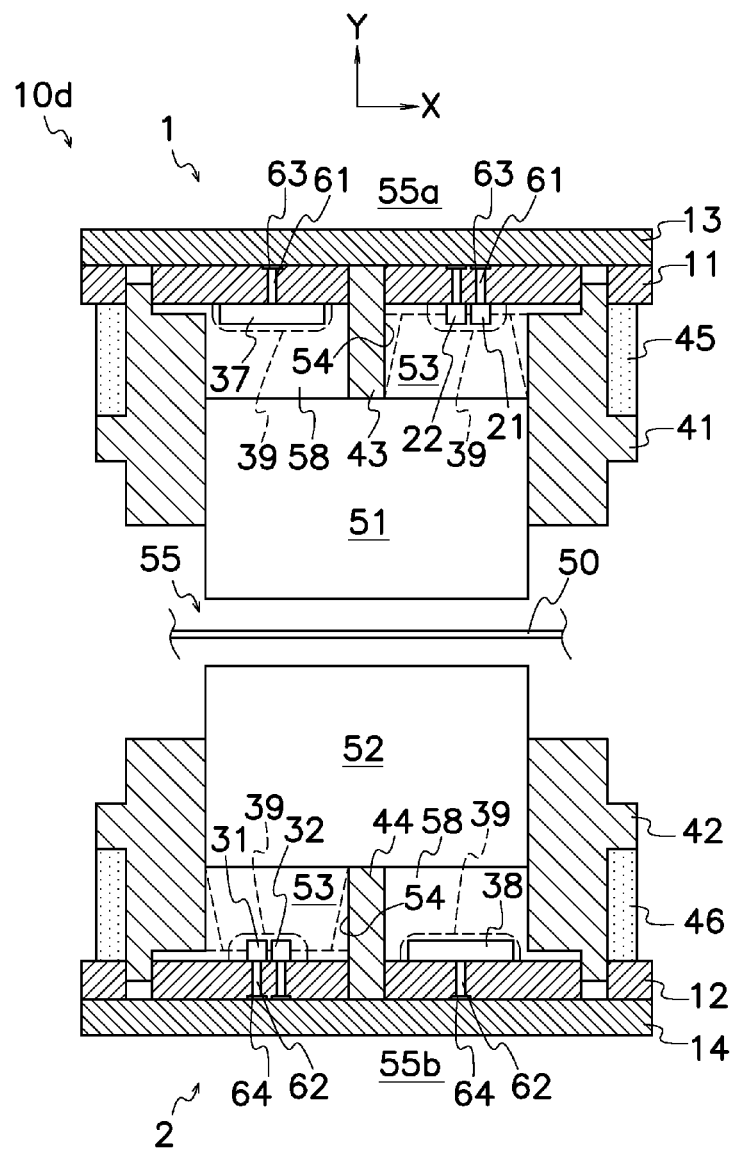
FIG. 6 is a longitudinal section view of a second embodiment of the document photosensor with six optical elements according to the present invention.
Figure 7:
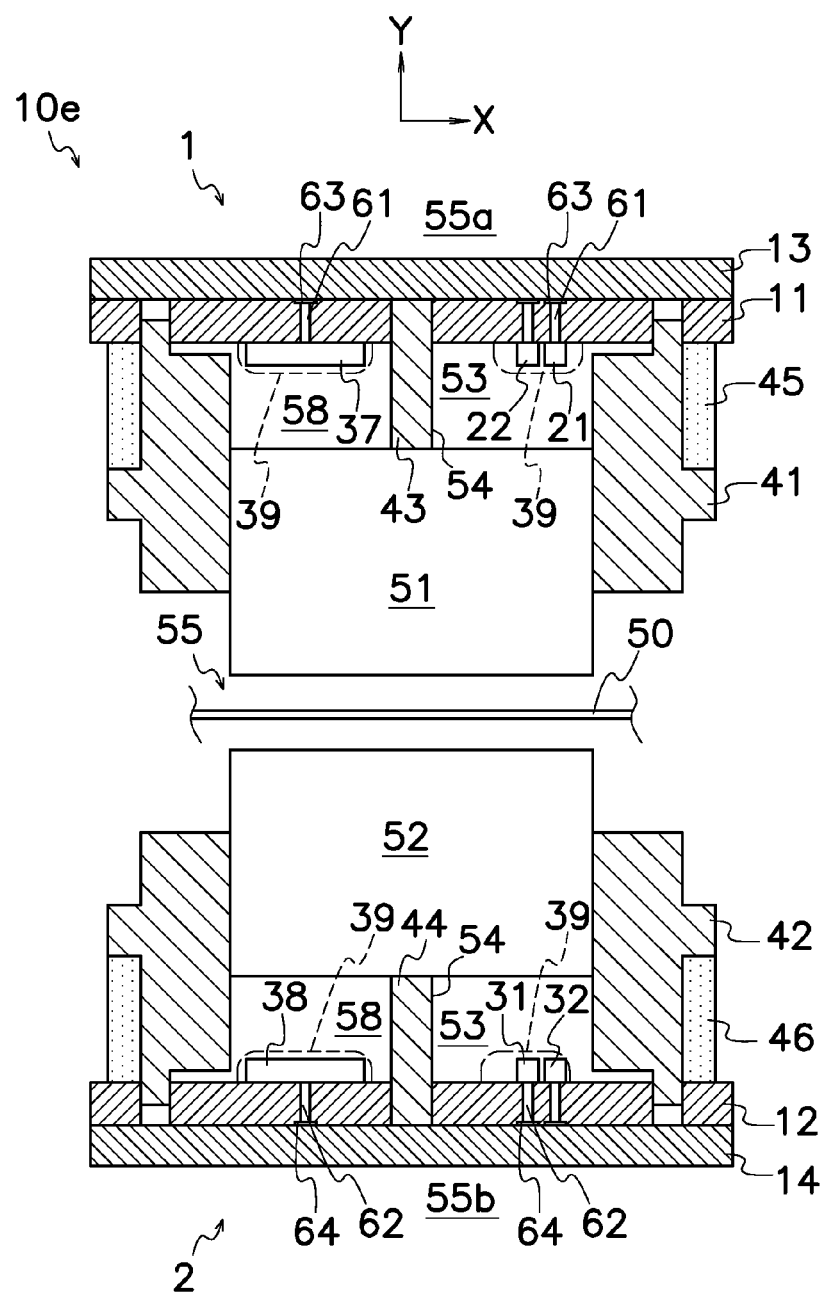
FIG. 7 is a longitudinal section view of a third embodiment of the document photosensor with six optical elements according to the present invention.

FIGS. 5 to 7 show the document photosensors 10c, 10d, 10e of six optical elements according to the present invention. As is apparent from FIG. 5, the document photosensor 10c comprises an upper sensor assembly 1 disposed on one side of passageway 55 along which document 50 is transported and a lower sensor assembly 2 disposed on the opposite side of passageway 55 from upper sensor assembly 1.

Upper sensor assembly (1) comprises an upper base plate 13 having a plurality of upper terminals 63, an upper substrate 11 secured on upper base plate 13 and having a plurality of upper conductive leads 61 electrically connected to corresponding upper terminals 63 on upper base plate 13, first and second upper LED chips (first and second upper light emitting elements) 21, 22 individually surface-mounted on upper substrate 11 and having a pair of terminals electrically connected to related ones of upper conductive leads 61, an upper PD chip (upper light receiving element) 37 surface-mounted on upper substrate 11 and having a pair of terminals electrically connected to related ones of upper conductive leads 61, an upper bracket 41 disposed on upper substrate 11, and an upper aspheric lens 51 supported on upper bracket 41.

As seen in FIG. 13, first and second upper LED chips 21, 22 each have one terminal separately secured on and electrically connected to upper discrete emission electrode 71 formed on upper substrate 11; each upper emission electrode 71 is connected to one of upper leads 61; and each the other terminal of first and second upper LED chips 21 and 22 is individually electrically connected to another lead 61 through golden wire. One terminal of upper PD chip 37 is secured on and electrically connected to upper receipt electrode 81 formed on upper substrate 11; upper receipt electrode 81 is connected to another one of upper leads 61; the other terminal of upper PD chip 37 is electrically connected to another one of upper leads 61 through golden wire. Upper emission and receipt electrodes 71 and 82 are disposed in alignment with first array line 56 perpendicular to the longitudinal direction of passageway 55. A plurality of upper leads 61 on upper substrate 11 are electrically connected to upper terminals 63 on upper base plate 13 through solder or metallic adhesive to feed electric power to first and second upper LED chips 21, 22 and upper PD chip 37 through upper leads 61. Aspheric lens 51 is fixed within upper bracket 41 opposite to first and second upper LED chips 21, 22 and upper PD chip 37.

Similarly to upper sensor assembly 1, lower sensor assembly 2 comprises a lower base plate 14 formed with plurality of lower terminals 64, first and second lower LED chips (first and second lower light emitting elements) 31, 32 each having two terminals electrically connected to a plurality of lower leads 62 electrically connected to corresponding lower terminals 64 on lower base plate 14, a lower PD chip (lower light receiving element) 38 surface-mounted on lower base plate 12 and having two terminals electrically connected to corresponding lower leads 62, a lower bracket 42 attached on lower substrate 12, and an aspheric lens 52 supported on lower bracket 42.

As shown in FIG. 13, each one terminal of first and second lower LED chips 31, 32 is secured on and electrically connected to discrete lower emission electrode 72 formed on lower substrate 12; each lower emission electrode 72 is connected to one of lower leads 62; each the other terminal of first and second lower LED chips 31, 32 is individually electrically connected to another lower lead 62 through golden wire. One terminal of lower PD chip 38 is secured on and electrically connected to lower acceptance electrode 82 formed on lower substrate 12; lower acceptance electrode 82 is connected to another one of lower leads 62; and the other terminal of lower PD chip 38 is connected to another one of lower leads 62 through golden wire. Lower emission and acceptance electrodes 72 and 82 are disposed in alignment with a second array line 57 perpendicular to the longitudinal direction of passageway 55. A plurality of lower leads 62 on lower substrate 12 are electrically connected to lower terminals 64 on lower base plate 14 through solder or metallic adhesive to supply electric power to first and second lower LED chips 31, 32 and lower PD chip 38 through lower leads 62. A lower aspheric lens 52 is fixed within lower bracket 42 opposite to first and second lower LED chips 31, 32 and lower PD chip 38.

Lower PD chip 38 receives lights irradiated from first and second upper LED chips 21, 22 and then penetrating bill 50, and a second length along second array line 57 of an acceptance surface in lower PD chip 38 is equal to or greater than a length along first array line 56 of an emission surface in upper LED chips 21, 22. Upper PD chip 37 receives lights irradiated from first and second lower LED chips 31, 32 and then penetrates bill 50, and a first length along first array line 56 of an acceptance surface in upper PD chip 37 is equal to or greater than a length along second array line 57 of an emission surface in lower LED chips 31, 32. Accordingly, upper and lower PD chips 37 and 38 may each receive a full amount of light penetrated through bill 50. Each of first and second lengths along respectively first and second array lines 56 and 57 is 1.5 mm or less.

Document photosensors 10c, 10d and 10e of six optical elements shown in FIGS. 5 to 7 have upper and lower aspheric lenses 51 and 52 that have the same structure and operation as those in document photosensors 10a and 10b of four optical elements shown in FIGS. 1 to 4. However, upper and lower aspheric lenses 51 and 52 may each respectively convert lights from first and second upper and lower upper and lower LED chips 21, 22 and 31, 32 into linear light beams of generally rectangular or ellipse section; these linear light beams have the longitudinal size in the transverse direction of passageway 55 longer than thickness size in the longitudinal direction of passageway 55; the longitudinal size of these light beams is longer than that in photosensors 10a and 10b of four optical elements in FIGS. 1 to 4; lower and upper PD chips 38 and 37 may detect respectively lights irradiated from adjoining first and second upper LED chips 21, 22 and from adjoining first and second lower LED chips 31, 32 and then penetrated through generally the same areas or mostly overlapped areas in bill 50. In other words, upper and lower aspheric lenses 51 and 52 may convert longer lights respectively along and from first and second upper LED chips 21, 22 and along and from first and second lower LED chips 31, 32 into parallel linear light beams while upper and lower aspheric lenses 51, 52 condense respectively lights from first and second lower LED chips 31, 32 and from first and second upper LED chips 21, 22 all through bill 50 onto upper and lower PD chips 37 and 38. No inherent unitized lens is required in first and second upper and lower light emitting elements 21, 22, 31 and 32.

Lights emitted from first and second lower LED chips 31, 32 are converted into a parallel linear light beam and projected onto bill 50 through lower aspheric lens 52. Light passed through bill 50 is gathered onto upper PD chip 37 through upper aspheric lens 51. Lights emitted from first and second upper LED chips 21, 22 are converted into a parallel linear light beam and projected onto bill 50 through upper aspheric lens 51. Light passed through bill 50 is focused onto lower PD chip 38 through lower aspheric lens 52. After turning first upper LED chip 21 off, second upper LED chip 22 is turned on to receive light from second upper LED chip 22 through bill 50 by lower PD chip 38. Likewise, after turning second upper LED chip 22 off, first lower LED chip 31 is turned on to receive light from lower LED chip 31 through bill 50 by upper PD chip 37. After turning first lower LED chip 31 off, second lower LED chip 32 is turned on to receive light from second lower LED chip 32 through bill 50 by upper PD chip 37. After turning second lower LED chip 32 off, first upper LED chip 21 is turned on to receive light from first upper LED chip 21 through bill 50 by lower PD chip 38.

In document photosensor 10c, 10d, 10e with six optical elements shown in FIGS. 5 to 7, upper and lower base plates 13 and 14 are secured on respectively upper and lower walls 55a, 55b to define passageway 55 within frame 104. Upper and lower brackets 41 and 42 comprise respectively upper and lower partitions 43 and 44 for isolating upper LED and PD chips 21 and 37, and lower LED and PD chips 31 and 38. Formed in upper and lower substrate 11 and 12 are respectively upper and lower openings 11a and 12a in which each end of upper and lower partitions 43 and 44 is fit for secure attachment of upper and lower brackets 41 and 42 in position.

In document photosensor 10c, 10d, 10e with six optical elements shown in FIGS. 5 to 7, an upper aspheric lens 51 is disposed on upper partition 43 in a spaced relation by a certain distance to upper first and second LED and PD chips 21, 22 and 37, and a lower aspheric lens 52 is disposed on lower partition 44 in a spaced relation by a certain distance to lower first and second LED and PD chips 31, 32 and 38. Upper partition 43 of upper bracket 41 serves to block direct incidence of light from upper first and second LED chips 21, 22 into upper PD chip 37 adjacent to upper first and second LED chips 21, 22 to prevent pseudo-lighting or malfunction of upper PD chip 37. Alike, lower partition 44 of lower bracket 42 serves to block direct incidence of light from lower first and second LED chips 31, 32 into lower PD chip 38 adjacent to lower first and second LED chips 31, 32 to prevent malfunction of lower PD chip 38.

In document photosensor 10c shown in FIG. 5, upper and lower first LED chips 21 and 31, upper and lower second LED chips 22 and 32 and upper and lower PD chips 37 and 38 are symmetrically disposed about a transversely central axis across passageway 55. Upper and lower first and second LED chips 21, 22, 32 and 32 may be turned on at different points in time under time division control to prevent simultaneous reception of lights from upper and lower first and second LED chips 21, 22, 31 and 32 by upper and lower PD chips 37 and 38.

Document photosensor 10d shown in FIG. 6, has first upper and lower LED chips 21, 31, second upper and lower LED chips 22, 32 and upper and lower PD chips 37, 38 symmetrically disposed about a central point within passageway 55. Document photosensor 10d shown in FIG. 6 is different from that in FIG. 5 to adjacently deploy first and second upper LED chips 21 and 22 and first and second lower LED chips 31 and 32. Document photosensor 10e shown in FIG. 7, has first upper and second lower LED chips 21 and 32, second upper and first lower LED chips 22 and 31 and upper and lower PD chips 37 and 38 symmetrically disposed about a transverse central axis across passageway 55. In document photosensors 10d and 10e shown in FIGS. 6 and 7, adjoining first and second upper LED chips 21 and 22 and adjoining first and second lower LED chips 31 and 32 may be surface-mounted on upper and lower substrates 11 and 12 in a spaced distance or with pitch less than 0.6 mm, preferably less than 0.45 mm.

In document photosensors 10c, 10e, 10e shown in FIGS. 5 to 7, first and second upper LED chips 21, 22, first and second lower LED chips 31, 32 may produce lights of different wavelength that penetrate bill 50 and then are detected by upper and lower PD chips 37 and 38 so that a control device (not shown) connected to upper and lower PD chips 37 and 38 may prepare four kinds of transmitted light pattern data and validate authenticity of bill 50 by comparing detected four kinds of light pattern data with reference pattern data or benchmarks previously stored in control device.

In document photosensors 10c, 10d shown in FIGS. 5 and 6, first upper and lower LED chips 21, 31 may be symmetrically located about a point to produce lights of same wavelength, and second upper and lower LED chips 22, 32 may be symmetrically located about a point to produce light of same wavelength to pick out same transmitted light pattern data independently of right side up or bottom side up insertion of bill 50 into inlet 101 of bill validator because lights of same wavelength penetrate and scan substantially the same positions in bill 50 from upside or downside in a mirror image. For example, for a baseline level in authenticity decision of bill 50, control device may decide bill 50 as genuine when the resultant light data patterns fulfill the following requirements:

1. Each ratio of received and added light amount from first and second upper LED chips 21, 22 to received light amount from first or second upper LED chip 21 or 22 is within a predetermined range, and 2. Each ratio of received and added light amount from first and second lower LED chips 31, 32 to received light amount from first or second lower LED chip 31 or 32 is within a predetermined range.

Figure 8:
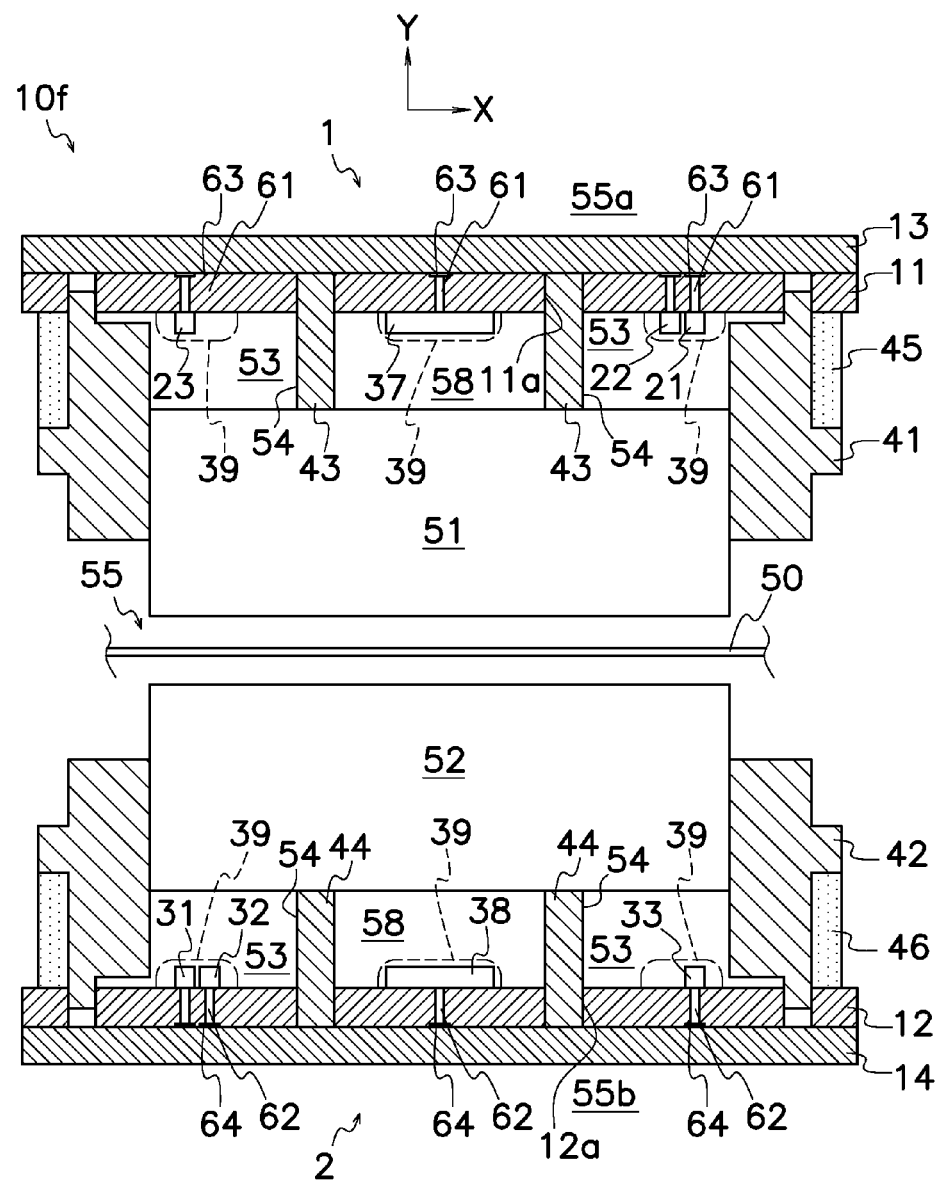
FIG. 8 is a longitudinal section view of a first embodiment of the document photosensor with eight optical elements according to the present invention.
Figure 9:
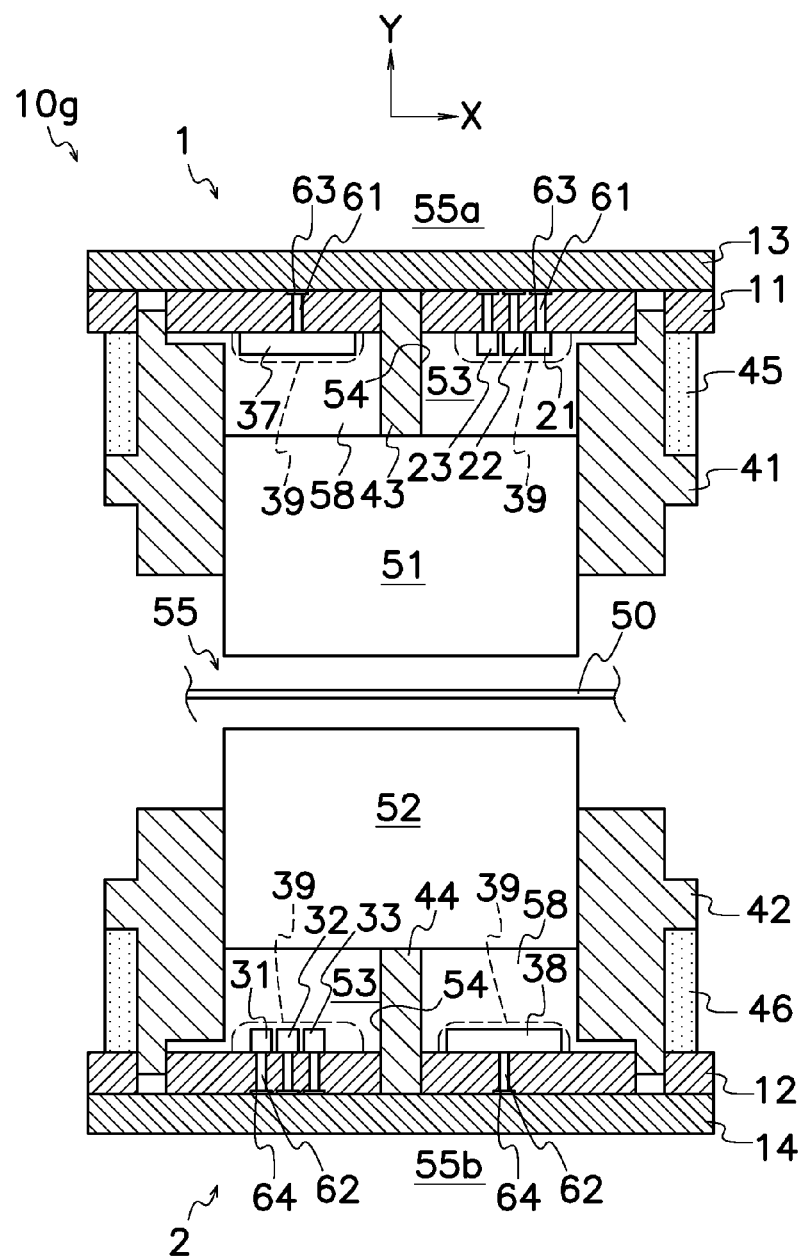
FIG. 9 is a longitudinal section view of a second embodiment of the document photosensor with eight optical elements according to the present invention.
Figure 10:
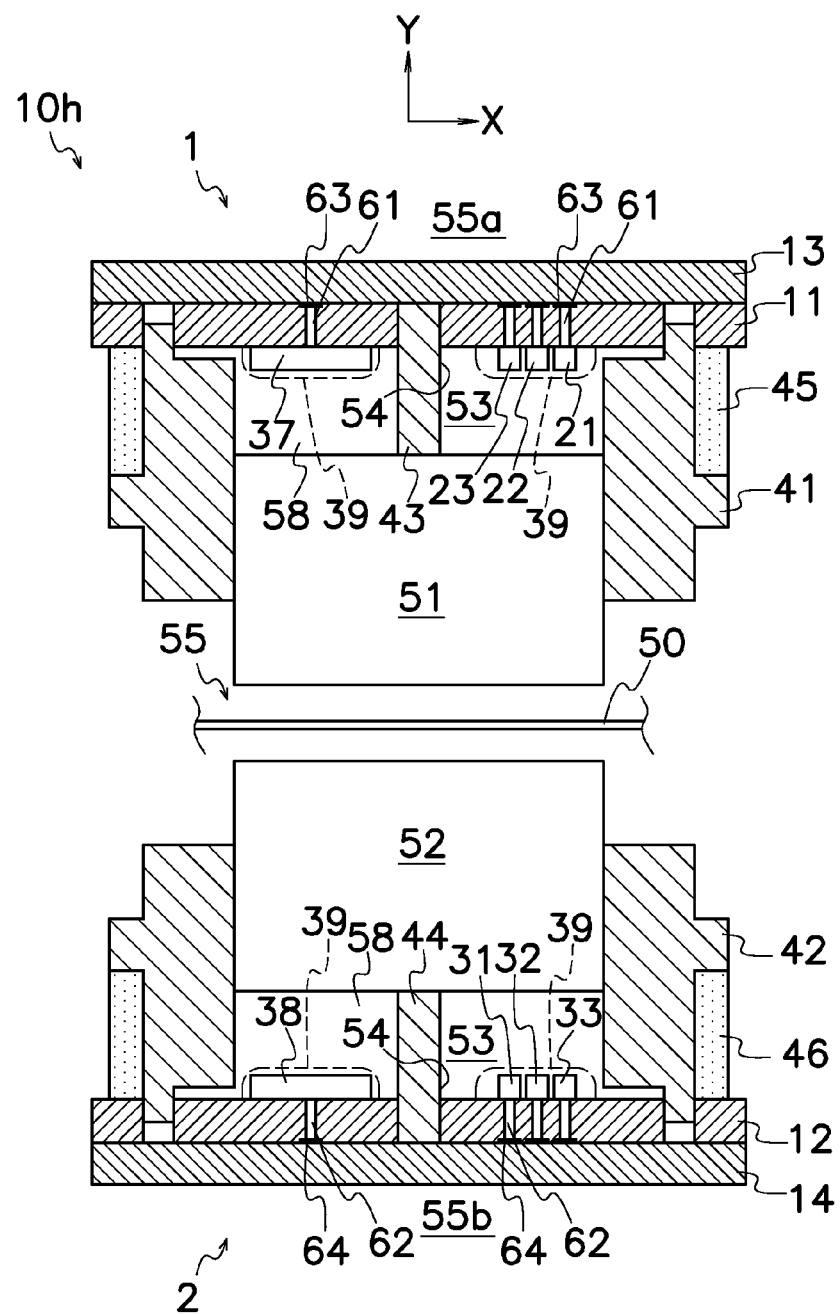
FIG. 10 is a longitudinal section view of a third embodiment of the document photosensor with eight optical elements according to the present invention.

FIGS. 8 to 10 illustrate document photosensors 10f, 10g, 10h with eight optical elements according to the present invention. Shown document photosensor 10f comprises an upper sensor assembly 1 disposed on one side of passageway 55 for guiding document 50, and a lower sensor assembly 2 disposed on the opposite side of passageway 55 from upper sensor assembly 1. Shown upper sensor assembly 1 comprises an upper base plate 13 formed with a plurality of terminals 63, an upper substrate 11 disposed on upper base plate 13 and having a plurality of upper conductive leads 61, first to third upper LED chips (first to third upper light emitting elements) 21 to 23 individually surface-mounted on upper substrate 11 and each having a pair of terminals electrically connected to related ones of upper conductive leads 61, and an upper PD chip (upper light receiving element) 37 surface-mounted on upper substrate 11 and having a pair of terminals electrically connected to related ones of upper conductive leads 61, an upper bracket 41 disposed on upper substrate 11, and an upper aspheric lens 51 supported by upper bracket 41.

As shown in FIG. 13, each of first to third upper LED chips 21 to 23 has one terminal secured on discrete upper emission electrodes 71 formed on upper substrate 11 and connected to different upper conductive leads 61, and each the other terminal of first to third upper LED chips 21 to 23 is electrically connected to another lead 61 through golden wire. Upper PD chip 37 has one terminal secured on and electrically connected to upper acceptance electrode 81 formed on upper substrate 11, and connected to one of upper connective leads 61, and the other terminal of upper PD chip 37 is electrically connected to another upper lead 61 through golden wire. Upper emission and acceptance electrodes 71, 81 are deployed in alignment along first array line 56 perpendicular to the moved direction of document in passageway 55. A plurality of upper leads 61 on upper substrate 11 are electrically connected to upper terminals 63 on upper base plate 13 by solder or brazing metal to feed electric power to first to third upper LED chips 21 to 23 and upper PD chip 37 through upper leads 61. Upper aspheric lens 51 is secured within upper bracket 41 opposite to first to third upper LED chips 21 to 23 and upper PD chip 37.

As shown in FIGS. 8 to 10, similarly to upper sensor assembly 1, lower sensor assembly 2 comprises a lower base plate 14 having a plurality of lower terminals 64, a lower substrate 12 disposed on lower base plate 14 and having a plurality of lower leads 62, first to third lower LED chips (first to third lower light emitting elements) 31, 32 and 33 individually surface-mounted on lower substrate 12 and each having two terminals electrically connected to lower leads 62, a lower PD chip (lower light receiving element) 38 surface-mounted on lower substrate (12) and having two terminals electrically connected to lower leads 62, a lower bracket 42 disposed on lower substrate 12, and a lower aspheric lens 52 supported by lower bracket 42.

As shown in FIG. 13, first to third lower LED chips 31, 32 and 33 each have one terminal secured on and electrically connected to discrete lower emission electrode 72 formed on lower substrate 12, each lower emission electrode 72 is connected to one of lower leads 62, each the other terminal of first to third lower LED chips 31, 32 and 33 are electrically connected to different lower lead 62 through golden wire. Lower PD chip 38 has one terminal secured on and electrically connected to lower emission electrode 82 formed on lower substrate 12, and lower emission electrode 82 is connected to another one of lower leads 62, the other terminal of lower PD chip 38 is connected to another one of lower leads 62 through golden wire. Lower emission and acceptance electrodes 72 and 82 are disposed in alignment with second array line 52 perpendicular to longitudinal direction of passageway 55. A plurality of lower leads 62 on lower substrate 12 are electrically connected to lower terminal 64 on lower base plate 14 through solder or brazing metal to separately provide electric power to first to third lower LED chips 31, 32 and 33 and lower PD chip 38. Lower aspheric lens 52 is secured within lower bracket 42 opposite to first to third lower LED chips 31, 32 and 33 and lower PD chip 38.

In document photosensors with eight optical elements shown in FIGS. 8 to 10, upper aspheric lens 51 is disposed on upper partition 43 in a spaced relation by a certain distance to first to third upper LED chips 21 to 23 and upper PD chip 37, and lower aspheric lens 52 is disposed on lower partition 44 in a spaced relation by a certain distance to first to third lower LED chips 31 to 33 and lower PD chip 38. Upper partition 43 of upper bracket 41 serves to block direct incidence of light from first to third upper LED chips 21 to 23 into upper PD chip 37 adjacent to first to third upper LED chips 21 to 23 to prevent pseudo-lighting or malfunction of upper PD chip 37. Alike, lower partition 44 of lower bracket 42 serves to block direct incidence of light from first to third lower LED chips 31 to 33 into lower PD chip 38 adjacent to first to third lower LED chips 31 to 33 to prevent pseudo-lighting of lower PD chip 38.

Lower PD chip 38 has the acceptance surface whose length along second array line 57 is equal to or greater than a length along first array line 56 of an emission surface in first to third upper LED chips 21 to 23. Likewise, upper PD chip 37 has the acceptance surface whose length along first array line 56 is equal to or greater than a length along second array line 57 of an emission surface in first to third lower LED chips 31 to 33. This structure ensures receipt of full amount of lights penetrated through bill 50 by upper and lower PD chips 37 and 38. For instance, each length along first and second array lines 56, 57 of respective acceptance surface in upper and lower PD chips 37, 38 may be equal to or less than 1.5 mm.

Upper and lower aspheric lenses 51 and 52 in document photosensors 10f, 10g, 10h with eight optical elements shown in FIGS. 8 to 10 have similar structure and equivalent function or performance to those in document photosensors 10c, 10d, 10e with six optical elements shown in FIGS. 5 to 7. However, upper and lower aspheric lenses 51 and 52 shown in FIGS. 8 to 10 may each respectively convert lights from first and second upper and lower upper and lower LED chips 21 to 23 and 31 to 33 into linear light beams of generally rectangular or ellipse section; these linear light beams have the longitudinal size in the transverse direction of passageway 55 longer than thickness size in the longitudinal direction of passageway 55; the longitudinal size of these light beams is longer than that in photosensors 10c, 10d and 10e of six optical elements in FIGS. 5 to 7; lower and upper PD chips 38 and 37 may detect respectively lights irradiated from adjoining first to third upper LED chips 21 to 23 and from adjoining first to third lower LED chips 31 to 33 and then penetrated through generally the same areas or mostly overlapped areas in bill 50. In other words, upper and lower aspheric lenses 51 and 52 may convert longer lights respectively along and from first to third upper LED chips 21 to 23 and along and from first to third lower LED chips 31 to 33 into parallel linear light beams while upper and lower aspheric lenses 51, 52 condense respectively lights from first to third lower LED chips 31 to 33 and from first to third upper LED chips 21 to 23 all through bill 50 onto upper and lower PD chips 37 and 38. No inherent unitized lens is required in first to third upper and lower light emitting elements 21 to 23, 31, 32 and 33.

In document photosensors 10f, 10g, 10h with eight optical elements shown in FIGS. 8 to 10, upper and lower base plates 13 and 14 are secured to respectively upper and lower walls 55a and 55b to define passageway 55 in frame 104. Upper and lower brackets 41 and 42 comprise respectively upper and lower partitions 43 and 44 for isolating upper LED and PD chips 21 to 23 and 37, and lower LED and PD chips 31 to 33 and 38. Formed in upper and lower substrate 11 and 12 are respectively upper and lower openings 11a and 12a in which each end of upper and lower partitions 43 and 44 is fit for secure attachment of upper and lower brackets 41 and 42 in position.

In document photosensor 10f shown in FIG. 8, symmetrically arranged about a central point within passageway 55 are respectively first upper and lower LED chips 21 and 31, second upper and lower LED chips 22 and 32, third upper and lower LED chips 33, and upper and lower PD chips 37 and 38. Turned on at different point in time under time division control are first to third upper and lower LED chips 21 to 23, 31, 32 and 33 to block simultaneous receipt of lights from first to third upper and lower LED chips 21 to 23 and 31 to 33 by upper and lower PD chips 37 and 38.

Upper PD chip 37 receives lights irradiated from first to third lower LED chips 31 to 33 and then penetrated through bill 50 moving along passageway 55, and lower PD chip 38 receives lights irradiated from first to third upper LED chips 21 to 23 and then penetrated through bill 50. Light irradiated from first upper LED chip 21 is converted through upper aspheric lens 51 into parallel light beams which then permeate bill 50 and are received by lower PD chip 38 through lower aspheric lens 52. For example, after extinction of first upper LED chip 21, second upper LED chip 22 is lightened; after extinction of second upper LED chip 22, third upper LED chip 23 is lightened to detect lights from first to third upper LED chips 21 to 23 by lower PD chip 38 at different times. Also, after extinction of third upper LED chip 23, first lower LED chip 31 is lightened to emit from lower LED chip 31 light which is then converted into parallel light beams through lower aspheric lens 52; light beams permeate bill 50 and are received by upper PD chip 37 through upper aspheric lens 51. After de-energization of first lower LED chip 31, second lower LED chip 32 is energized, and after de-energization of second lower LED chip 32, third lower LED chip 33 is energized to detect lights from first to third lower LED chips 31 to 33 by upper PD chip 37 at different times.

In document photosensor 10g shown in FIG. 9, symmetrically arranged about a central point within passageway 55 are respectively first upper and third lower LED chips 21 and 33, second upper and lower LED chips 22 and 32, third upper and first lower LED chips 23 and 31, and upper and lower PD chips 37 and 38. Similarly to document photosensor 10g of FIG. 9, document sensor 10h of FIG. 10 indicates the symmetrical positions of first to third upper LED chips 21 to 23 and upper PD chip 37 relative to first to third lower LED chips 31 to 33 and lower PD chip 38 about a central transverse axis within passageway 55. However, the arrangement in FIG. 10 is different from that in FIG. 8 because FIG. 8 indicates the structure wherein upper PD chip 37 and upper partition 43 of upper bracket 41 stand between first and second upper LED chips 21, 22 and third upper LED chip 23, and likewise, lower PD chip 38 and lower partition 44 of lower bracket 42 stand between first and second lower LED chips 31, 32 and third lower LED chip 33. In document photosensors 10f, 10g, 10h shown in FIGS. 8 to 10, a distance of 0.6 mm or less may be retained between adjoining LED chips for first to third upper and lower LED chips 21 to 23 and 31 to 33 secured on first and second substrates 11 and 12.

In document photosensors 10f, 10g, 10h with eight optical elements shown in FIGS. 8 to 10, first to third upper and lower LED chips 21 to 23 and 31 to 33 may be lightened with different wavelengths to detect and prepare six kinds of transmitted light pattern data of bill 50 by control device (not shown) electrically connected to upper and lower PD chips 37 and 38 so that control device may compare detected six kinds of data with reference benchmarks stored in control device to validate authenticity of bill 50.

Document photosensor 10f shown in FIG. 8 has three LED chip pairs symmetrically arranged each other that comprise first upper and lower LED chips 21 and 31, second upper and lower LED chips 22 and 32, and third upper and lower LED chips 23 and 33 to produce lights of the same wavelength from paired LED chips. This enables to pick out same transmitted light pattern data independently of right side up or bottom side up insertion of bill 50 into inlet 101 of bill validator because lights of same wavelength penetrate and scan substantially the same positions in bill 50 from upside or downside in mirror image. For example, for a baseline level in authenticity decision of bill 50, control device may decide bill 50 as genuine when the resultant light data patterns fulfill the following requirements:

1. Each ratio of received and added light amount from first to third upper LED chips 21 to 23 to received light amount from any one of first to third upper LED chips 21 to 23 is within a predetermined range, and 2. Each ratio of received and added light amount from first to third lower LED chips 31 to 33 to received light amount from any one of first to third lower LED chips 31 to 33 is within a predetermined range.

Figure 11:
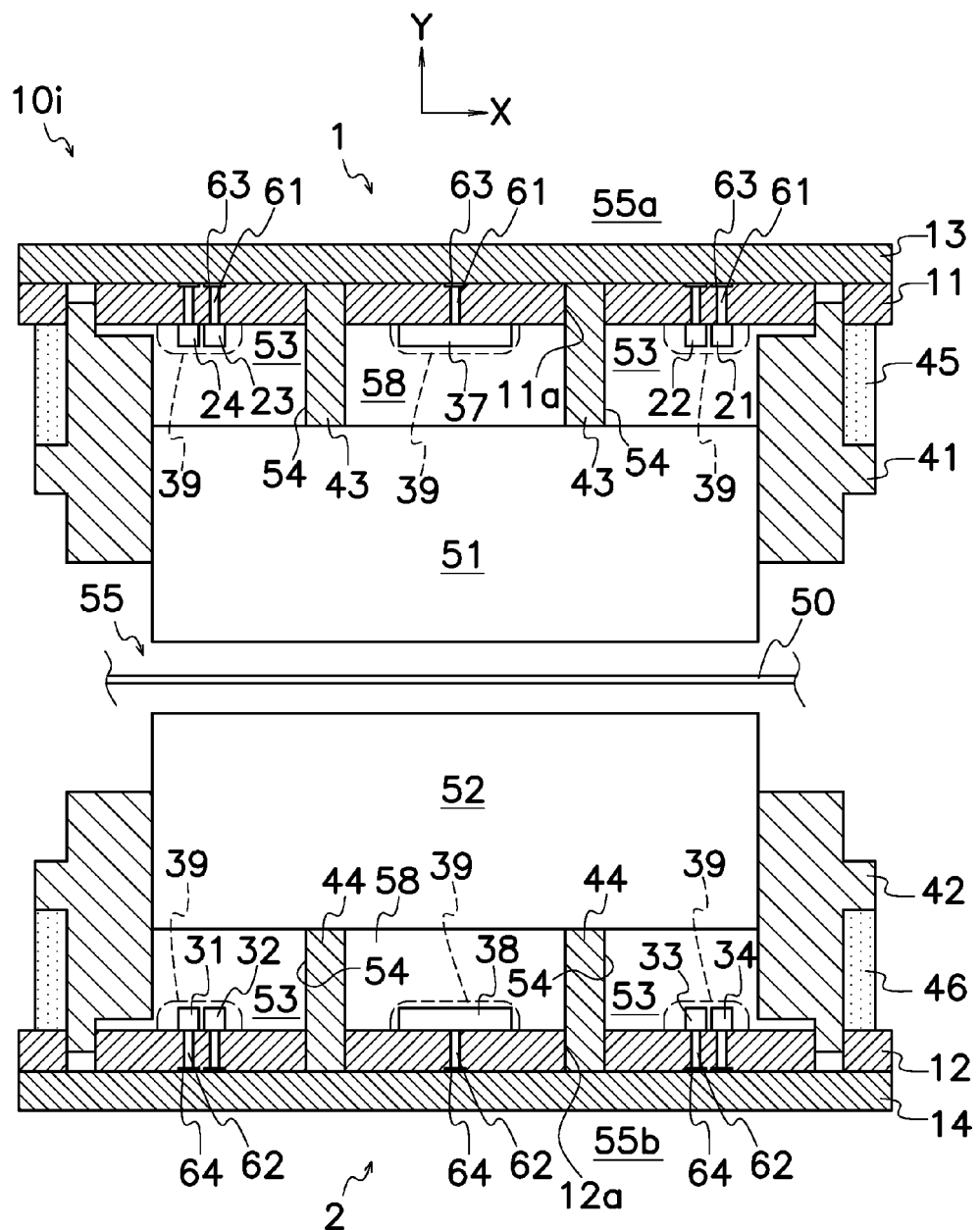
FIG. 11 is a longitudinal section view of a first embodiment of the document photosensor with ten optical elements according to the present invention.
Figure 12:
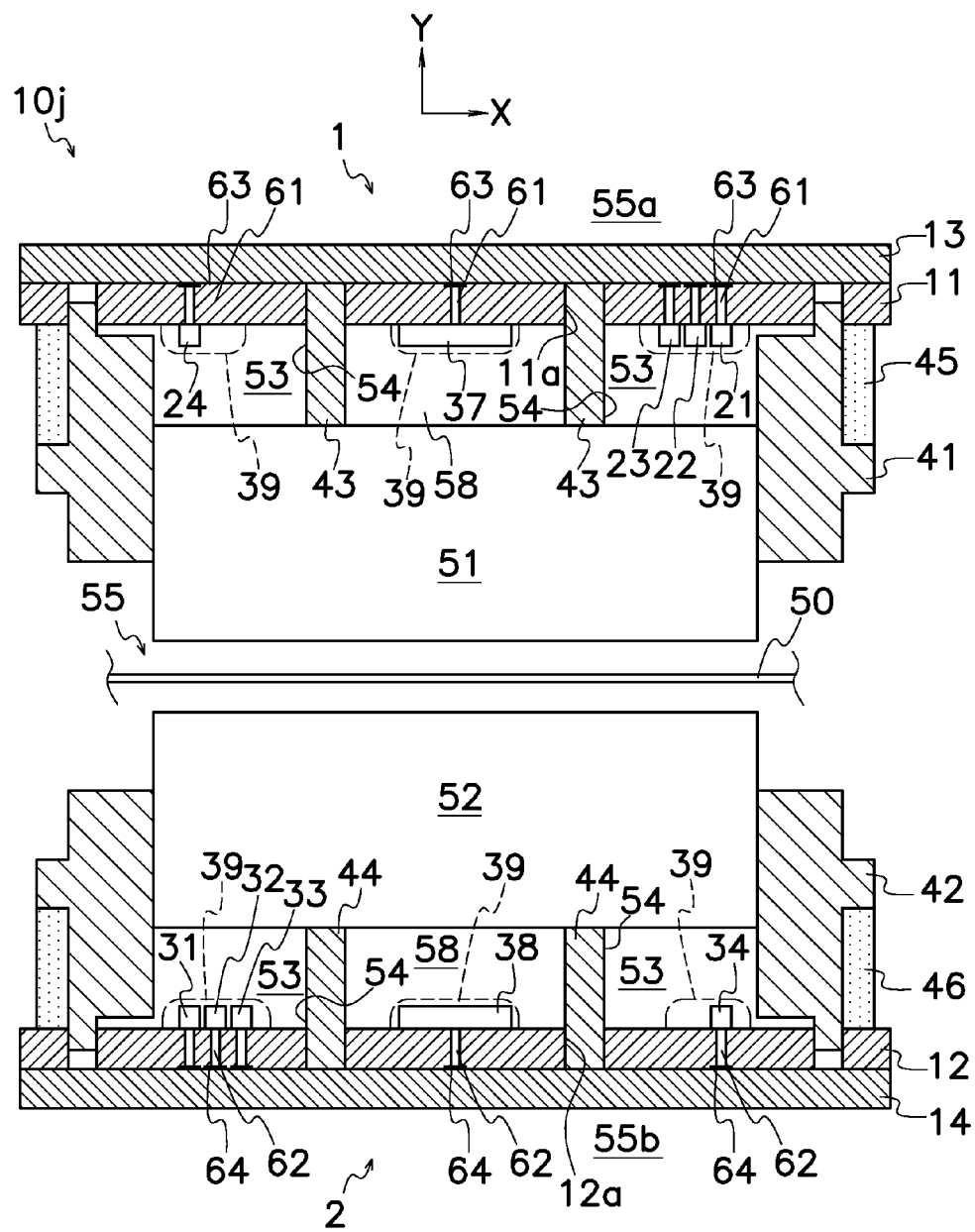
FIG. 12 is a longitudinal section view of a second embodiment of the document photosensor with ten optical elements according to the present invention.

FIGS. 11 and 12 illustrate document photosensors 10i and 10j with ten optical elements according to the present invention. Document photosensor 10i shown in FIG. 11 comprises upper sensor assembly 1 disposed on one side of passageway 55 along which bill 50 is transported and lower sensor assembly 2 disposed on the opposite side of passageway 55 from upper sensor assembly 1. Upper sensor assembly 1 comprises upper base plate 13 having a plurality of upper terminals 63, upper substrate 11 disposed on upper base plate 13 and having a plurality of upper conductive leads 61, first to fourth upper LED chips 21 to 24 individually surface-mounted on upper substrate 11 and each having a pair of terminals electrically connected to related ones of upper conductive leads 61, upper PD chip 37 surface-mounted on upper substrate 11 and having a pair of terminals electrically connected to related ones of upper conductive leads 61, upper bracket 41 disposed on upper substrate 11, and an upper aspheric lens 51.

As shown in FIG. 13, first to fourth upper LED chips 21 to 24 each have one terminal individually secured on and electrically connected to discrete upper emission electrode 71 formed on upper substrate 11; each upper emission electrode 71 is connected to one of upper leads 61; the other terminals of first to fourth upper LED chips 21 to 24 are individually electrically connected to different ones of upper leads 61 through golden wire. One terminal of upper PD chip 37 is secured on and electrically connected to upper acceptance electrode 81 formed on upper substrate 11; upper acceptance electrode 81 is connected to another one of upper leads 61; and the other terminal of upper PD chip 37 are electrically connected to another upper lead 61 through golden wire. Upper emission and acceptance electrodes 71 and 81 are arranged in alignment with first array line 56 perpendicular to longitudinal direction of passageway 55. A plurality of upper leads 61 on upper substrate 11 are electrically connected to upper terminals 63 on upper substrate 13 through solder or brazing metal to individually feed electric power to first to fourth upper LED chips 21 to 24 through upper leads 61. Upper aspheric lens 51 is secured within upper bracket 41 opposite to first to fourth upper LED chips 21 to 24 and upper PD chip 37.

Just as upper sensor assembly 11 already is, as shown in FIGS. 11 and 12, lower sensor assembly 2 comprises a lower base plate 14 having a plurality of lower terminals 64, a lower substrate 12 disposed on lower base plate 14 and having a plurality of lower leads 62, first to fourth lower LED chips 31 to 34 individually surface-mounted on lower substrate 12 and having a pair of terminals electrically connected to related ones of lower conductive leads 62, a lower PD chip (lower light receiving element) 38 surface-mounted on lower substrate 12 and having a pair of terminals electrically connected to related ones of lower conductive leads 62, a lower bracket 42 disposed on lower substrate 12, and a lower aspheric lens 52 supported on lower bracket 42.

As shown in FIG. 13, first to fourth lower LED chips 31, 32, 33, 34 each have one terminal individually secured on and electrically connected to discrete lower emission electrode 72 formed on lower substrate 12; each lower emission electrode 72 is connected to one of lower leads 62; the other terminal of first to fourth lower LED chips 31 to 34 is individually electrically connected to another one of lower leads 62 through golden wire. One terminal of lower PD chip 38 is secured on and electrically connected to lower acceptance electrode 82 formed on lower substrate 12; lower acceptance electrode 82 is connected to another one of lower leads 62; the other terminal of lower PD chip 38 is electrically connected to another one of lower leads 62 through golden wire. Lower emission and acceptance electrodes 72 and 81 are arranged in alignment with second array line 57 perpendicular to longitudinal direction of passageway 55. A plurality of lower leads 62 on lower substrate 12 are electrically connected to lower terminals 64 on lower base plate 14 via solder or brazing metal to individually provide electric power to first to fourth lower LED chips 31 to 34 and lower PD chip 38. Lower aspheric lens 52 is secured within lower bracket 42 opposite to first to fourth lower LED chips 31 to 34 and lower PD chip 38.

Document photosensor 10i shown in FIG. 11, a pitch distance of 0.6 mm or less may be set between adjoining chips in first to fourth upper and lower LED chips 21 to 24 and 31 to 34. Upper aspheric lens 51 converts all lights from first to fourth upper LED chips 21 to 24 into parallel light beams of generally rectangular or ellipse section that are projected onto bill 50 with the light beams of their longitudinal projective length (in the transverse direction of passageway 55) greater than their width length (in the longitudinal direction of passageway 55) so that lower and upper PD chips 38 and 37 may each detect light patterns transmitted through substantially same area or mainly overlapped area of bill 50 after irradiation from first to fourth upper and lower LED chips 21 to 24 and 31 to 34.

To this end, upper and lower aspheric lenses 51 and 52 may transform into parallel linear light beams all lights from first to fourth upper and lower LED chips 21 to 24 and 31 to 34. Also, upper and lower aspheric lenses 51 and 52 may operate to converge onto respectively upper and lower PD chip 37 and 38 lights from first to fourth lower LED chips 31 to 34 and first to fourth upper LED chips 21 to 24 after their transmission through bill 50 without requirement of providing any inherent unitized lens in first to fourth upper and lower light emitting elements 21 to 24 and 31 to 34.

Document photosensor 10i shown in FIG. 11, upper and lower base plates 13 and 14 are secured to respectively upper and lower walls 55a and 55b to define passageway 55 in frame 104. Upper and lower brackets 41 and 42 comprise respectively upper and lower partitions 43 and 44 for isolating first to fourth upper LED and PD chips 21 to 24 and 37, and first to fourth lower LED and PD chips 31 to 34 and 38. Formed in upper and lower substrate 11 and 12 are respectively upper and lower openings 11a and 12a in which each end of upper and lower partitions 43 and 44 is fit for secure attachment of upper and lower brackets 41 and 42 in position.

Upper and lower aspheric lenses 51 and 52 are disposed on respectively upper and lower partitions 43 and 44 in a spaced relation to first to fourth upper LED chips 21 to 24 and PD chip 37 and to first to fourth lower LED chips 31 to 34 and PD chip 38. Upper partition 43 of upper bracket 41 serves to block direct incidence of light from first to fourth upper LED chips 21 to 24 into upper PD chip 37 adjacent to first to fourth upper LED chips 21 to 24 to prevent pseudo-lighting or malfunction of upper PD chip 37. Alike, lower partition 44 of lower bracket 42 serves to block direct incidence of light from first to fourth lower LED chips 31 to 34 into lower PD chip 38 adjacent to first to fourth lower LED chips 31 to 34 to prevent pseudo-lighting of lower PD chip 38.

Lower PD chip 38 has the acceptance surface whose length along second array line 57 is equal to or greater than a length along first array line 56 of an emission surface in first to fourth upper LED chips 21 to 24. Likewise, upper PD chip 37 has the acceptance surface whose length along first array line 56 is equal to or greater than a length along second array line 57 of an emission surface in first to fourth lower LED chips 31 to 34. This structure ensures receipt of full amount of lights penetrated through bill 50 by upper and lower PD chips 37 and 38. By way of example, each length along first and second array lines 56, 57 of respective acceptance surface in upper and lower PD chips 37, 38 may be equal to or less than 1.5 mm.

In document photosensor 10i shown in FIG. 11, upper PD chip 37 is arranged between a pair of first and second upper LED chips 21, 22 and a pair of third and fourth upper LED chips 23, 24, and lower PD chip 38 is arranged between a pair of first and second lower LED chips 31, 32 and a pair of third and fourth lower LED chips 33, 34. Document photosensor 10i has the axisymmetric structure about Z and X axes passing a central point in passageway 55 regarding first upper and lower LED chips 21, 31, second upper and lower LED chips 22, 32, third upper and lower LED chips 23, 33 and fourth upper and lower LED chips 24, 34. First to fourth upper and lower LED chips 21 to 24 and 31 to 34 are turned on at different points in time to block simultaneous receipt of lights from first to fourth upper and lower LED chips 21 to 24 and 31 to 34 by upper and lower PD chips 37 and 38.

After extinction of first upper LED chip 21, second upper LED chip 22 is turned on; after extinction of second upper LED chip 22, third upper LED chip 23 is turned on; after extinction of third upper LED chip 23, fourth upper LED chip 24 is turned on to detect all lights from first to fourth upper LED chips 21 to 24 by lower PD chip 38. Then, after extinction of fourth upper LED chip 24, first lower LED chip 31 is turned on to produce a light that is converted through lower aspheric lens 52 into parallel light beams that are received by upper PD chip 37 through upper aspheric lens 51. After extinction of first lower LED chip 31, second lower LED chip 32 is turned on; after extinction of second lower LED chip 32, third lower LED chip 33 is turned on; after extinction of third lower LED chip 33, fourth lower LED chip 34 is turned on; all lights from first to fourth lower LED chips 31 to 34 are received by upper PD chip 37.

In document photosensor 10i with ten optical elements shown in FIG. 11, first to fourth upper and lower LED chips 21 to 24 and 31 to 34 may emit lights of different wavelength to detect and prepare eight kinds of transmitted light pattern data of bill 50 by control device (not shown) electrically connected to upper and lower PD chips 37 and 38 so that control device may compare detected eight kinds of data with reference benchmarks stored in control device to validate authenticity of bill 50.

Document photosensor 10f shown in FIG. 11 has four LED chip pairs symmetrically arranged each other that comprise first upper and lower LED chips 21 and 31, second upper and lower LED chips 22 and 32, third upper and lower LED chips 23 and 33 and four upper and lower LED chips 24 and 34 to produce lights of the same wavelength from paired LED chips. This enables to pick out same transmitted light pattern data independently of right side up or bottom side up insertion of bill 50 into inlet 101 of bill validator because lights of same wavelength penetrate and scan substantially the same positions in bill 50 from upside or downside in mirror image. For example, for a baseline level in authenticity decision of bill 50, control device may decide bill 50 as genuine when the resultant light data patterns fulfill the following requirements:

1. Each ratio of received and added light amount from first to fourth upper LED chips 21 to 24 to received light amount from any one of first to fourth upper LED chips 21 to 24 is within a predetermined range, and 2. Each ratio of received and added light amount from first to fourth lower LED chips 31 to 34 to received light amount from any one of first to fourth lower LED chips 31 to 34 is within a predetermined range.

In document photosensor 10j shown in FIG. 12, upper PD chip 37 is arranged between a group of first to third upper LED chips 21 to 23 and fourth upper LED chips 24, and lower PD chip 38 is arranged between a group of first to third lower LED chips 31 to 33 and fourth lower LED chip 34. As document photosensor 10i shown in FIG. 11, document photosensor 10j has the axisymmetric structure about Z axis regarding first to fourth upper LED chips 21 to 24 and upper PD chip 37 with respect to first to fourth lower LED chips 31 to 34 and lower PD chip 38. Document photosensors 10i and 10j are different from each other because in document photosensor 10j, upper PD chip 37 and upper partition 43 of upper bracket 41 separate first to third upper LED chips 21 to 23 from fourth upper LED chip 24, and likewise, lower PD chip 38 and lower partition 44 of lower bracket 42 separate first to third lower LED chips 31 to 33 from fourth lower LED chip 34. In document photosensor 10j of FIG. 12, a pitch distance of 1 mm or less, preferably 0.6 mm or less may be set between adjoining chips in first to third upper and lower LED chips 21 to 23 and 31 to 33.

In document photosensor 10j with ten optical elements shown in FIG. 12, upper PD chip 37 in a light receiving chamber 58 may receive lights that are emitted from first to third lower LED chips 31 to 33 and penetrated through bill 50 moving along passageway 55 and also that is emitted from fourth upper LED chip 24 and reflected on bill 50. Likewise, lower PD chip 38 in light receiving chamber 58 may receive lights that are emitted from first to third upper LED chips 21 to 23 and penetrated through bill 50 and also that is emitted from fourth lower LED chip 34 and reflected on bill 50. As upper PD chip 37 receives lights irradiated from first to third lower LED chips 31 to 33 and penetrated through bill 50, and lower PD chip 38 receives lights irradiated from first to third upper LED chips 21 to 23 and penetrated through bill 50, control device may prepare six kinds of transmitted light pattern data of bill 50 and compare them with previously stored transmitted light pattern data or benchmarks to decide validity of bill 50 with high accuracy.

Also, when upper PD chip 37 in light receiving chamber 58 receives light from fourth upper LED chip 24 and reflected on bill 50 and lower PD chip 38 in light receiving chamber 58 receives light from fourth lower LED chip 34 and reflected on bill 50, control device may prepare additional two kinds of reflected light pattern data to distinguish a kind of bill 50. When one of first to third upper LED chips 21 to 23 irradiates light of same wavelength as that of light irradiated from fourth upper LED chip 24, and one of first to third lower LED chips 31 to 33 irradiates light of same wavelength as that of light irradiated from fourth lower LED chip 34, control device can pick out same reflected or transmitted light pattern data for identification of bill kind and bill validation independently of right side up or bottom side up insertion of bill 50 into inlet 101 of bill validator because lights of same wavelength penetrate and scan substantially the same positions in bill 50 from upside or downside in mirror image.

In document photosensors 10a to 10j with four, six, eight and ten optical elements according to the present invention, first to fourth upper and lower LED chips 21 to 24 and 31 to 34 are light emitting diodes (LED chips) that irradiate lights of wavelength selected from the groups of ultraviolet, blue, green, red, near-infrared and infrared rays. Not shown in detail in the drawings, but, each LED chip may comprise a semiconductor substrate and anode and cathode electrodes formed on upper and bottom surfaces of semiconductor substrate.

As shown in FIG. 13, a cathode (bottom) electrode of each LED chip is electrically connected to upper and lower emission electrodes 71 and 72 of upper and lower substrates 11 and 12 through conductive adhesive such as solder, and upper and lower emission electrodes 71 and 72 are electrically connected to respectively upper and lower leads 61 and 62. Anode electrodes (upper electrodes) of LED chips each are electrically connected to upper and lower leads 61 and 62 on upper and lower substrates 11 and 12 through metallic thin lines or bonding wires such as golden wires. All embodiments of the present invention contemplate coverage by light-transmissive protective resin 39 that encapsulates light-emitting semiconductor diode chips, metallic thin lines, a part of first and second leads 61 and 62 exposed from first and second substrates 11 and 12 to prevent extrusion of extraneous material such as moisture into the device from outside for degradation control of LED chips 21 to 24 and 31 to 34.

Upper and lower PD chips 37 and 38 are photodiodes that each comprise a semiconductor substrate, anode and cathode terminals formed on semiconductor substrate. Each anode terminal (one terminal) of upper and lower PD chips 37 and 38 are electrically connected to upper and lower acceptance electrodes 81 and 82 on upper and lower substrates 11 and 12, and each cathode terminal (the other terminal) of upper and lower PD chips 37 and 38 are electrically connected to upper and lower leads 61 and 62 though metallic thin lines or bonding wires such as golden wires. Like LED chips 21 to 24 and 31 to 34, the present invention contemplates coverage by light-transmissive protective resin 39 that encapsulates photodiode chips, metallic thin lines, a part of first and second leads 61 and 62 exposed from first and second substrates 11 and 12 to prevent extrusion of extraneous material such as moisture into the device from outside for degradation control of LED chips 21 to 24 and 31 to 34. In lieu of or in addition to photodiodes, substitutes or other optical detectors such as phototransistors of emitter, base and collector terminals may be used.

Known printed circuit boards such as glass epoxy substrate may be used to prepare upper and lower substrates 11 and 12 and upper and lower base plates 13 and 14, and a printing machine not shown is used to print solder paste on upper and lower substrates 11 and 12 to form upper and lower emission electrodes 71 and 72 and upper and lower acceptance electrodes 81 and 82. Then, mounters not shown are used to mount first to fourth upper and lower LED chips 21 to 24 and 31 to 34 and upper and lower PD chips 37 and 38 in solder paste on upper and lower substrates 11 and 12 with high accuracy. Then, upper and lower substrates 11 and 12 are located in reflow furnace to fasten all chips 21 to 24, 31 to 34, 37 and 38 on upper and lower emission electrodes 71 and 72 and upper and lower acceptance electrodes 81 and 82 by heating solder paste. Subsequently, wire bonding technique is used to electrically connect between mating electrodes to supply electric power to upper and lower terminals 63 and 64 from power source not shown of bill validator.

In document photosensors 10a to 10j, first to fourth upper light emitting elements 21 to 24 are arranged on upper substrate 11 in alignment with first array line 56 perpendicular to longitudinal direction of passageway 55 to locate upper light receiving element 37 between first and second upper light emitting elements 21 and 22, between second and third upper light emitting elements 22 and 23 or between third and fourth upper light emitting elements 23 and 24. Likewise, first to fourth lower light emitting elements 31 to 34 are arranged on lower substrate 12 in alignment with second array line 57 perpendicular to longitudinal direction of passageway 55 to locate lower light receiving element 38 between first and second lower light emitting elements 31 and 32, between second and third lower light emitting elements 32 and 33 or between third and fourth lower light emitting elements 33 and 34.

In manufacture, a pitch distance of a few millimeters, in fact 1 mm or less, preferably 0.6 mm or less may be set between adjoining chips in first to third upper and lower LED chips 21 to 23 and 31 to 33 exactly surface-mounted on upper and lower substrates 11 and 12 by mounters. This can achieve detection by upper and lower PD chips 37 and 38 of lights irradiated form first to fourth upper and lower LED chips 21 to 24 and 31 to 34 and transmitted through substantially same or overlapped area of bill 50 for improvement in detection accuracy.

Direct attachment of first to fourth upper and lower LED chips 21 to 24 and 31 to 34 on upper and lower substrates 11 and 12 is very advantageous because it can notably and more reduce the thickness and array length of document photosensors 10a to 10j compared to prior art structures by pin-insertion technique. Also, this direct attachment can realize attachment of each LED chips 21 to 24 and 31 to 34 on upper and lower substrates 11 and 12 in exact alignment with their optical axes for without irregular or deviated attachment of LED chips unlike prior art sensing devices whose plastic shell and extended outer pins may disadvantageously lead to deviation or misalignment of mounted LED chips in plastic shells on the order of 150 micrometers when outer pins are attached in through-holes. However, the present invention may control deviation or misalignment below a few micrometers in mounting first to fourth upper and lower LED chips 21 to 24 and 31 to 34 on upper and lower substrates 11 and 12.

Now, as shown in FIG. 14, document photosensors may be assembled by mounting in turn respectively upper and lower substrates 11, 12, upper and lower brackets 41, 42, upper and lower aspheric lenses 51, 52 over upper and lower base plates 13, 14. Upper and lower brackets 41, 42 are formed from opaque or light-impermeable plastic material selected from the group of epoxy resin, ABS resin, polycarbonate resin, polyamide resin, polyacetal resin, polypropylene and acrylic resin. Upper and lower aspheric lenses 51, 52 are formed from transparent or light-permeable plastic material such as polycarbonate resin or acrylic resin.

Figure 15:
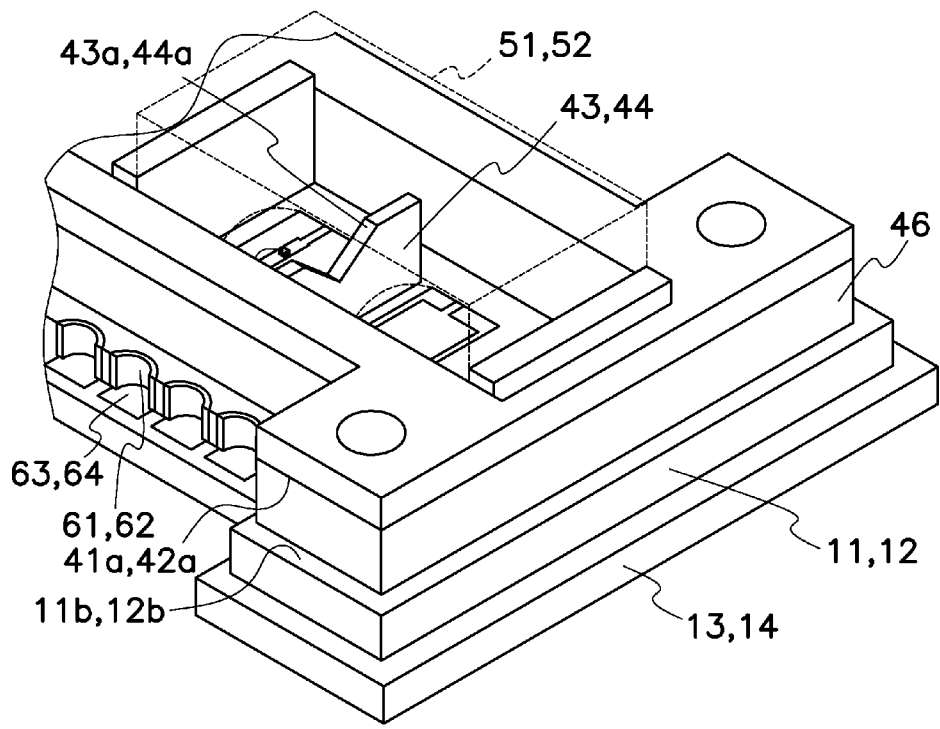
FIG. 15 is a partially enlarged perspective view of a typical arrangement of light emitting and receiving elements mounted on a substrate for use in the present invention.

As shown in FIG. 15, flexible sealing members 46 are attached to or integrally formed with a bottom portion of upper and lower brackets 41, 42 to bring flexible sealing members 46 into close contact to a surface of upper and lower substrates 11, 12 when upper and lower brackets 41, 42 are mounted on upper and lower substrates 11, 12. For example, upper and lower brackets 41, 42 are formed of relatively hard plastics such as epoxy resin, and sealing members 46 are formed of relatively soft elastomer such as silicone resin along bottoms of and integrally with upper and lower brackets 41, 42 so that sealing members 46 may slightly deform along edges 11b, 12b of upper and lower substrates 11, 12 when sealing members 46 are brought into contact to edges 11b, 12b. Sealing members 46 ensures firm sealing between upper and lower brackets 41, 42 and upper and lower substrates 11, 12 to prevent incidence of ambient lights and invasion of extraneous substance into upper and lower brackets 41, 42 that may deteriorate detection accuracy for upper and lower sensor assemblies 1, 2. Sealing members 46 also serve to firmly support mechanically structural elements in assemblies.

As is apparent from FIG. 14, each of upper and lower aspheric lenses 51, 52 has the generally pentagonal section made up of a round tip 51d, 52d for forming cylindrical or curved surface, and two tapered surfaces 51a, 52a converging toward round tip 51a, 52a. Formed at upper portions of upper and lower partitions 43, 44 in upper and lower brackets 41, 42 are notches with two tapered surfaces 43a, 44a of the shape complementary to tapered surfaces 51a, 52a of aspheric lenses 51, 52. As shown in FIG. 15, when upper and lower aspheric lenses 51, 52 are attached on upper and lower brackets 41, 42, tapered surfaces 51a, 52a of aspheric lenses 51, 52 are appropriately fit on two tapered surfaces 43a, 44a of partitions 43, 44 for their secure support. Preferably, tapered surfaces 51a, 52a may have an angle in an angular range between 60 and 120 degrees, in particular of 90 degrees to properly convert lights from first to fourth upper and lower LED chips 21 to 24 and 31 to 34 into parallel light beams toward bill 50. Upper and lower aspheric lenses 51, 52 have plane surfaces 51b, 52b opposite to tapered surfaces 51a, 52a to irradiate lights of generally rectangular section from plane surfaces 51b, 52b.

As shown in FIGS. 11 and 12, each length along X axis of upper and lower aspheric lenses 51, 52 is longer than each array length of first to fourth upper LED chips 21 to 24 and upper PD chip 37 and first to fourth lower LED chips 31 to 34 and lower PD chip 38, both aspheric lenses 51, 52 are arranged in a line along X axis to positively irradiate lights from first to fourth upper and lower LED chips 21 to 24 and 31 to 34 onto upper and lower PD chips 37, 38 while penetrating upper and lower aspheric lenses 51, 52 and bill 50.

Figure 16:
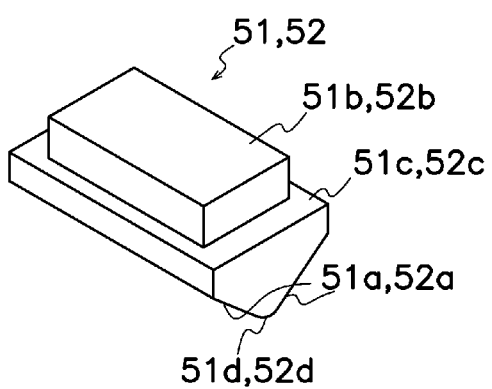
FIG. 16 is a perspective view showing a variation of an aspheric lens.

Upper and lower aspheric lenses 51, 52 each have their elongated longitudinal length perpendicular to longitudinal direction of passageway 55 to widen, along elongated longitudinal length of aspheric lenses 51, 52, light beams irradiated from plane surfaces 51b, 52b of aspheric lenses 51, 52. Whereas prior art shell-shaped LEDs irradiate lights of generally circular section onto bill, document photosensors 10 according to these embodiments may irradiate light beams of generally rectangular section onto bill 50 through upper and lower aspheric lenses 51, 52 to pick out transmitted light data through a wider range of bill 50. As shown in FIG. 16, steps 51c, 52c may be formed between plane surfaces 51b, 52b and tapered surface 51a, 52a of upper and lower aspheric lenses 51, 52 to reduce areas of plane surfaces 51b, 52b for the purpose of confining a light irradiation area on bill 50 and detecting transmitted light data of a narrower area in bill 50.

Document photosensors of the invention may have four, six, eight or ten optical elements of same or different structures apposed along X axis. In fact, document photosensors shown in FIGS. 17 to 21 utilize ultraviolet, blue, green, red, near infrared and infrared rays LED chips UV, B, G, R NIR and IR of respectively their wavelengths on the order of 370, 470, 525, 620, 740 and 830 nm.

Figure 17:
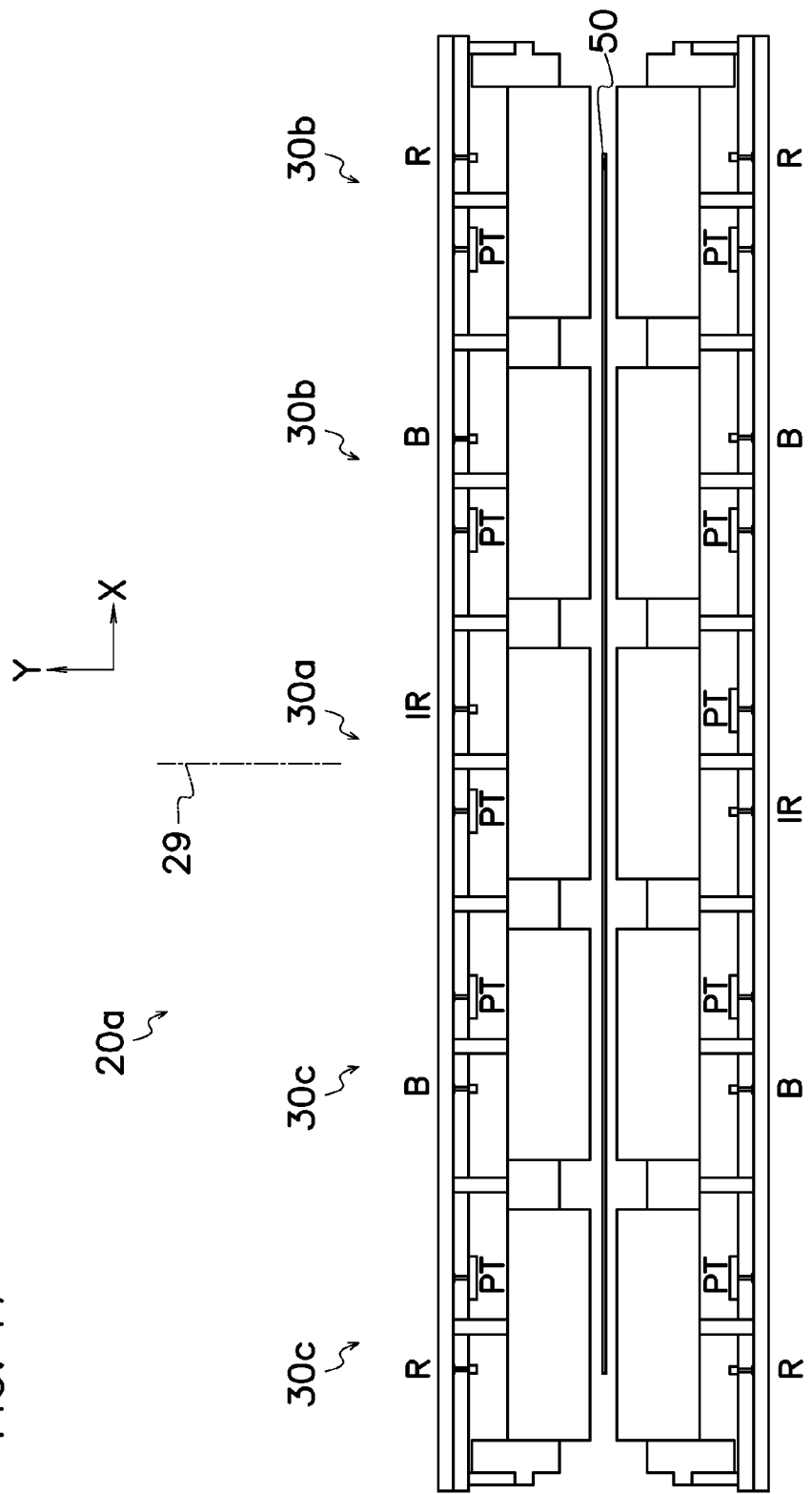
FIG. 17 is a longitudinal section view showing an embodiment of the document photosensor according to the present invention comprising five optical sensor devices each having four optical elements.

An embodiment of the sensor device 20a shown in FIG. 17 comprises a central document photosensor 30a with four optical elements, two right and left side document photosensors 30b, 30c each with four optical elements on either side of central document photosensor 30a all disposed in a line along X axis. Central document photosensor 30a comprises first upper and lower LED chips 21, 31 disposed as in document photosensor 10a shown in FIG. 1. Right side document photosensor 30b comprises first upper and lower LED chips 21, 31 disposed as in document photosensor 10b shown in FIG. 3. Left side document photosensor 30c has an inverted structure of right side document photosensor 30b about central document photsensor 30a wherein each chip is disposed in a symmetric position regarding first upper and lower LED chips 21, 31 and upper and lower PD chips 37, 38 in document photosensor shown in FIG. 3.

First upper and lower LED chips 21, 31 in each document photosensors 30a, 30b, 30c are turned on at different points in time under time division control. Also, although upper and lower LED chips 21, 31 are turned on at a time, upper and lower partitions 43, 44 for separating between adjoining document photosensors 30a, 30b, 30c effectively prevent simultaneous detection of plural light by upper and lower PD chips 37, 38.

Upper and lower LED chips 21, 31 produce lights of bilaterally symmetrical wavelength about a central vertical axis 29 of central document photosensor 30a. This LED chip array enables to pick out same transmitted light pattern data independently of right side up or bottom side up insertion of bill 50 into inlet 101 of bill validator because lights of same wavelength penetrate and scan substantially the same positions in bill 50 from upside or downside in mirror image. For example, if inverted bill 50 is inserted into passageway 55, lights of same wavelength are irradiated onto bill 50 from the upper and lower sides.

Control device decides an amount of a first light irradiated from first upper LED chip 21 in upper sensor assembly 1, penetrated through bill 50 and received by lower PD chip 38. Control device also decides an amount of a second light irradiated from first lower LED chip 31 in lower sensor assembly 2, penetrated through bill 50 and received by upper PD chip 37. In addition, when received amount of first and second lights is in a predetermined rage range, control device decides bill 50 as genuine to drive conveyer device to transmit bill 50 to a stacking chamber.

In the sensor device 20a shown in FIG. 17, right and left side document photosensors 30b, 30c on the opposite sides of central photosensor 30a in a line are used to decide a kind of bill 50. When first upper and lower LED chips 21, 31 in right and left side document photosensors 30b, 30c irradiate first and second lights which are reflected on bill 50 and received by upper and lower PD chips 37, 38 in light receiving chamber 58, control device may compare amount of first and second lights received by upper and lower PD chips 37, 38 with stored one to decide a kind of inserted bill 50.

Figure 18:
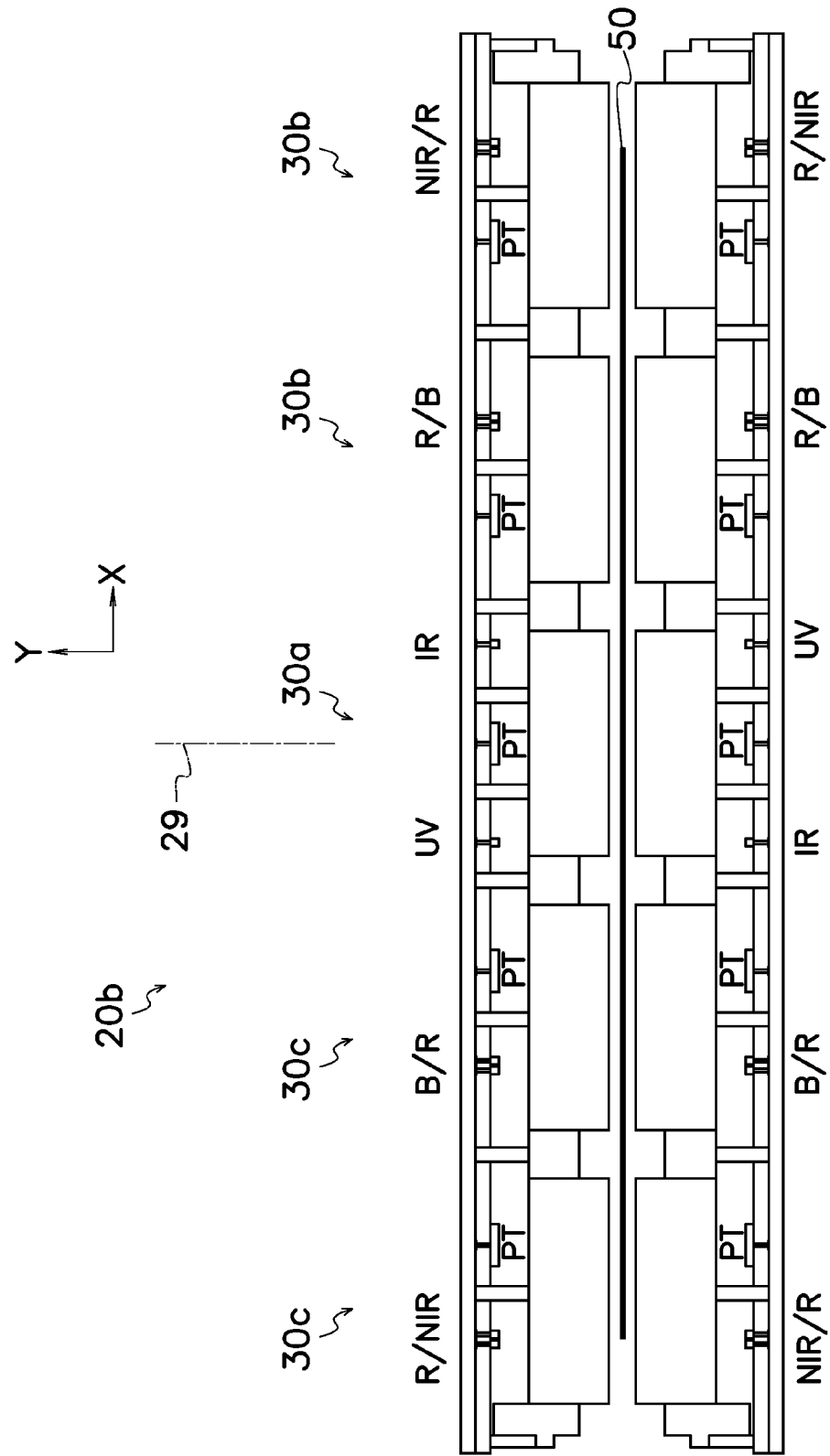
FIG. 18 is a longitudinal section view showing an embodiment of the document photosensor according to the present invention comprising five optical sensor devices each having six optical elements.

Another embodiment of the sensor device 20b shown in FIG. 18 comprises a central document photosensor 30a with six optical elements, two right and left side document photosensors 30b, 30c each with six optical elements on either side of central document photosensor 30a all disposed in a line along X axis. Central document photosensor 30a comprises first and second upper and lower LED chips 21, 22, 31, 32 disposed as in document photosensor 10c shown in FIG. 5. Right side document photosensor 30b comprises first and second upper and lower LED chips 21, 22, 31, 32 disposed as in document photosensor 10b shown in FIG. 6. Left side document photosensor 30c has an inverted structure of right side document photosensor 30b about central document photsensor 30a wherein each chip is disposed in a symmetric position regarding first and second upper and lower LED chips 21, 22, 31, 32 and upper and lower PD chips 37, 38 in document photosensor 10b shown in FIG. 6.

First and second upper and lower LED chips 21, 22, 31, 32 in each document photosensor 30a, 30b, 30c are turned on at different points in time. Also, although LED chips 21, 22, 31, 32 in each document photosensor 30a, 30b, 30c are turned on at a time, upper and lower partitions 43, 44 for separating between adjoining document photosensors 30a, 30b, 30c effectively prevent simultaneous detection of plural light by upper and lower PD chips 37, 38.

Upper and lower LED chips 21, 22, 31, 32 produce lights of bilaterally symmetrical wavelength about a central vertical axis 29 of central document photosensor 30a. This LED chip array enables to pick out same transmitted light pattern data independently of right side up or bottom side up insertion of bill 50 into passageway 55 of bill validator because lights of same wavelength penetrate and scan substantially the same positions in bill 50 from upside or downside in mirror image. For example, if inverted bill 50 is inserted into passageway 55, lights of same wavelength are irradiated onto bill 50 from the upper and lower sides.

Control device decides a total amount of received lights by adding amounts of first and second lights that are irradiated from first and second upper LED chips 21, 22, penetrated through bill 50 and received by lower PD chip 38. Then, control device calculates ratio of received amounts of first and second lights to the total amount, and decides bill 50 as genuine when each quotient is within a predetermined range.

As in upper sensor assembly 1, in lower sensor assembly 2, control device decides a total amount of received lights by adding amounts of third and fourth lights that are irradiated from first and second lower LED chips 31, 32, penetrated through bill 50 and received by upper PD chip 37. Then, control device calculates ratio of received amounts of third and fourth lights to the total amount, and decides bill 50 as genuine when each quotient is within a predetermined range. In this way, control device decides bill 50 as genuine when ratio of received amount of first to fourth lights to total amount is within a predetermined range to transmit bill 50 to a stacking chamber.

In the sensor device 20b shown in FIG. 18, right and left side document photosensors 30b, 30c on the opposite sides of central document photosensor 30a in a line are used to decide a kind of bill 50. When second upper and lower LED chips 22, 32 in right and left side document photosensors 30b, 30c irradiate second and fourth lights which are reflected on bill 50 and received by upper and lower PD chips 37, 38 in light receiving chamber 58.

Figure 19:
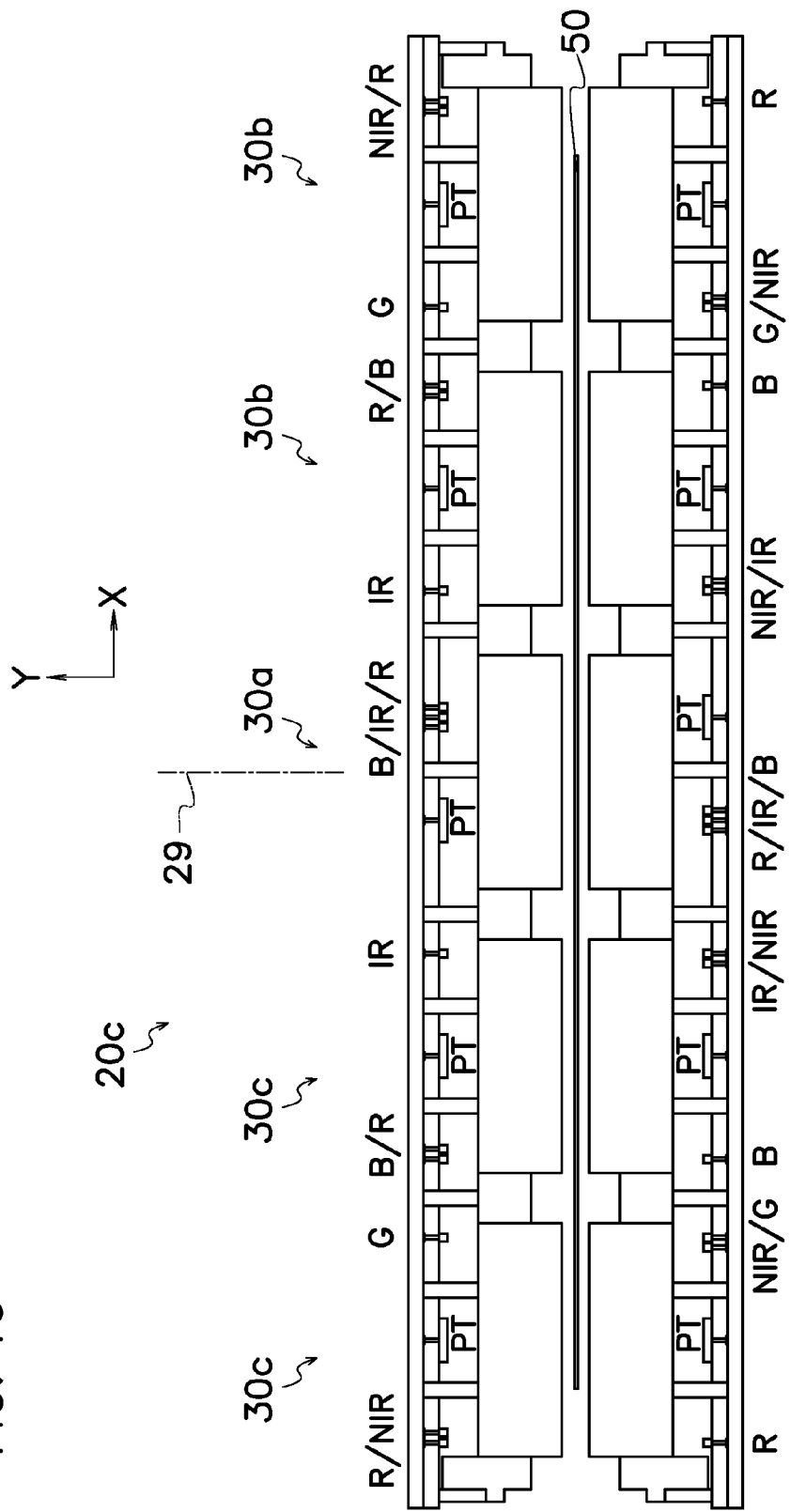
FIG. 19 is a longitudinal section view showing an embodiment of the document photosensor according to the present invention comprising five optical sensor devices each having eight optical elements.

Still another embodiment of the sensor device 20c shown in FIG. 19 comprises a central document photosensor 30a with eight optical elements, two right and left side document photosensors 30b, 30c each with eight optical elements on either side of central document photosensor 30a all disposed in a line along X axis. Central document photosensor 30a comprises first to third upper and lower LED chips 21 to 23 and 31 to 33 disposed as in document photosensor 10g shown in FIG. 9. Right side document photosensor 30b comprises first to third upper and lower LED chips 21 to 23 and 31 to 33 disposed as in document photosensor 10f shown in FIG. 8. Left side document photosensor 30c has an inverted structure of right side document photosensor 30b about central document photsensor 30a wherein each chip is disposed in a symmetric position regarding first and second upper and lower LED chips 21 to 23, 31 to 33 and upper and lower PD chips 37, 38 in document photosensor 10f shown in FIG. 8.

First to third upper and lower LED chips 21 to 23 and 31 to 33 in each document photosensor 30a, 30b, 30c are turned on at different points in time. Also, although LED chips 21 to 23 and 31 to 33 in each document photosensor 30a, 30b, 30c are turned on at a time, upper and lower partitions 43, 44 for separating between adjoining document photosensors 30a, 30b, 30c effectively prevent simultaneous detection of plural light by upper and lower PD chips 37, 38.

Upper and lower LED chips 21 to 23 and 31 to 33 produce lights of bilaterally symmetrical wavelength about a central vertical axis 29 of central document photosensor 30a. This LED chip array enables to pick out same transmitted light pattern data independently of right side up or bottom side up insertion of bill 50 into passageway 55 of bill validator because lights of same wavelength penetrate and scan substantially the same positions in bill 50 from upside or downside in mirror image. For example, if inverted bill 50 is inserted into passageway 55, lights of same wavelength are irradiated onto bill 50 from the upper and lower sides.

Control device decides a total amount of received lights by adding amounts of first and second lights that are irradiated from first and second upper LED chips 21, 22, penetrated through bill 50 and received by upper PD chip 37. Then, control device calculates ratio of received amounts of first and second lights to the total amount, and decides bill 50 as genuine when each quotient is within a predetermined range.

As in upper sensor assembly 1, in lower sensor assembly 2, control device decides a total amount of received lights by adding amounts of third and fourth lights that are irradiated from first and second lower LED chips 31, 32, penetrated through bill 50 and received by upper PD chip 37. Then, control device calculates ratio of received amounts of third and fourth lights to the total amount, and decides bill 50 as genuine when each quotient is within a predetermined range. In this way, control device decides bill 50 as genuine when ratio of received amount of first to fourth lights to total amount is within a predetermined range to transmit bill 50 to a stacking chamber.

In the sensor device 20c shown in FIG. 19, when third upper and lower LED chips 23, 33 in right and left side document photosensors 30b, 30c irradiate fifth and sixth lights which are reflected on bill 50 and received by upper and lower PD chips 37, 38 in light receiving chamber 58, control device may compare amount of fifth and sixth lights received by upper and lower PD chips 37, 38 with predetermined levels to decide a kind of inserted bill 50.

Figure 20:
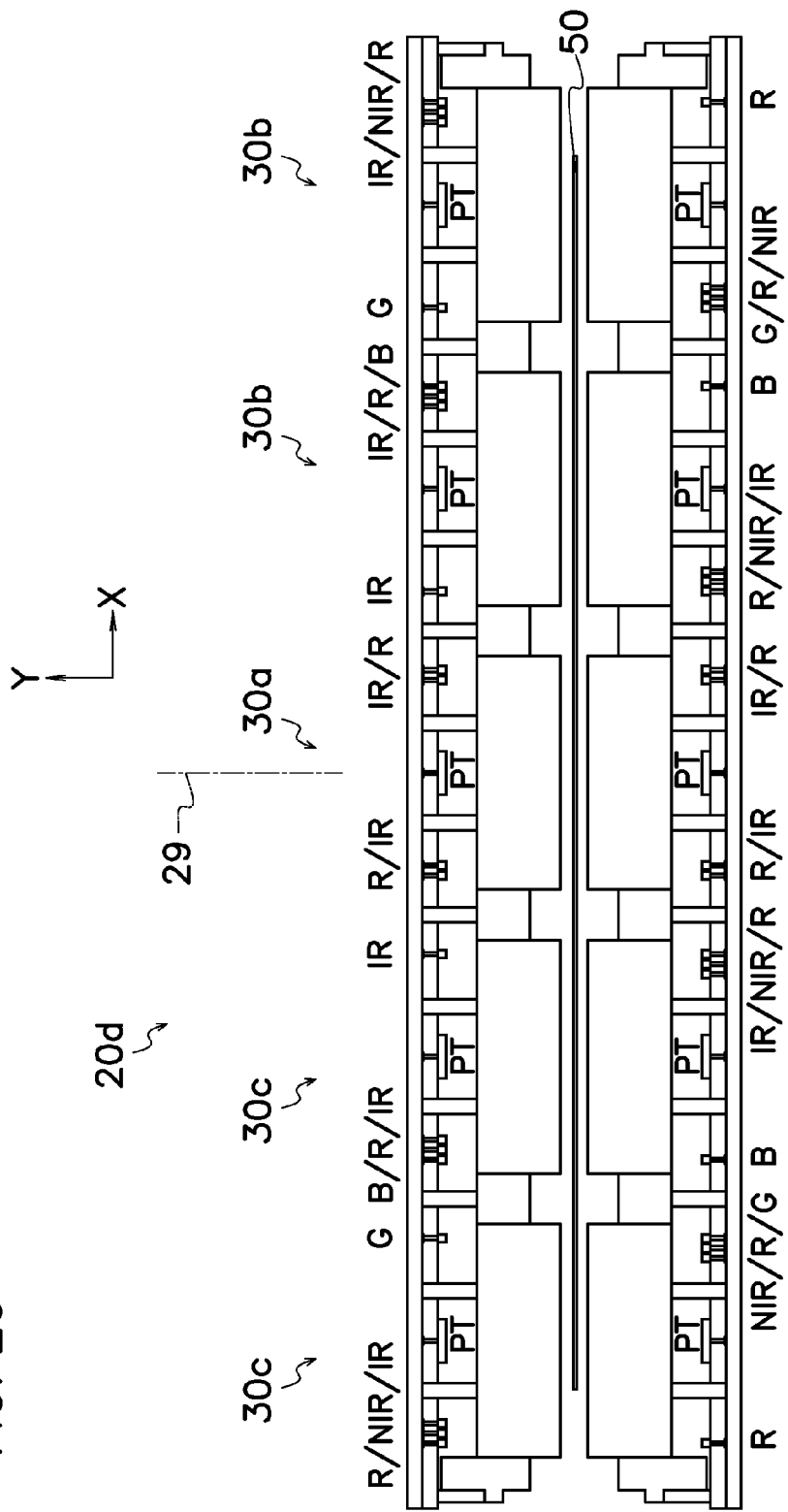
FIG. 20 is a longitudinal section view showing an embodiment of the document photosensor according to the present invention comprising five optical sensor devices each having ten optical elements.
Figure 21:
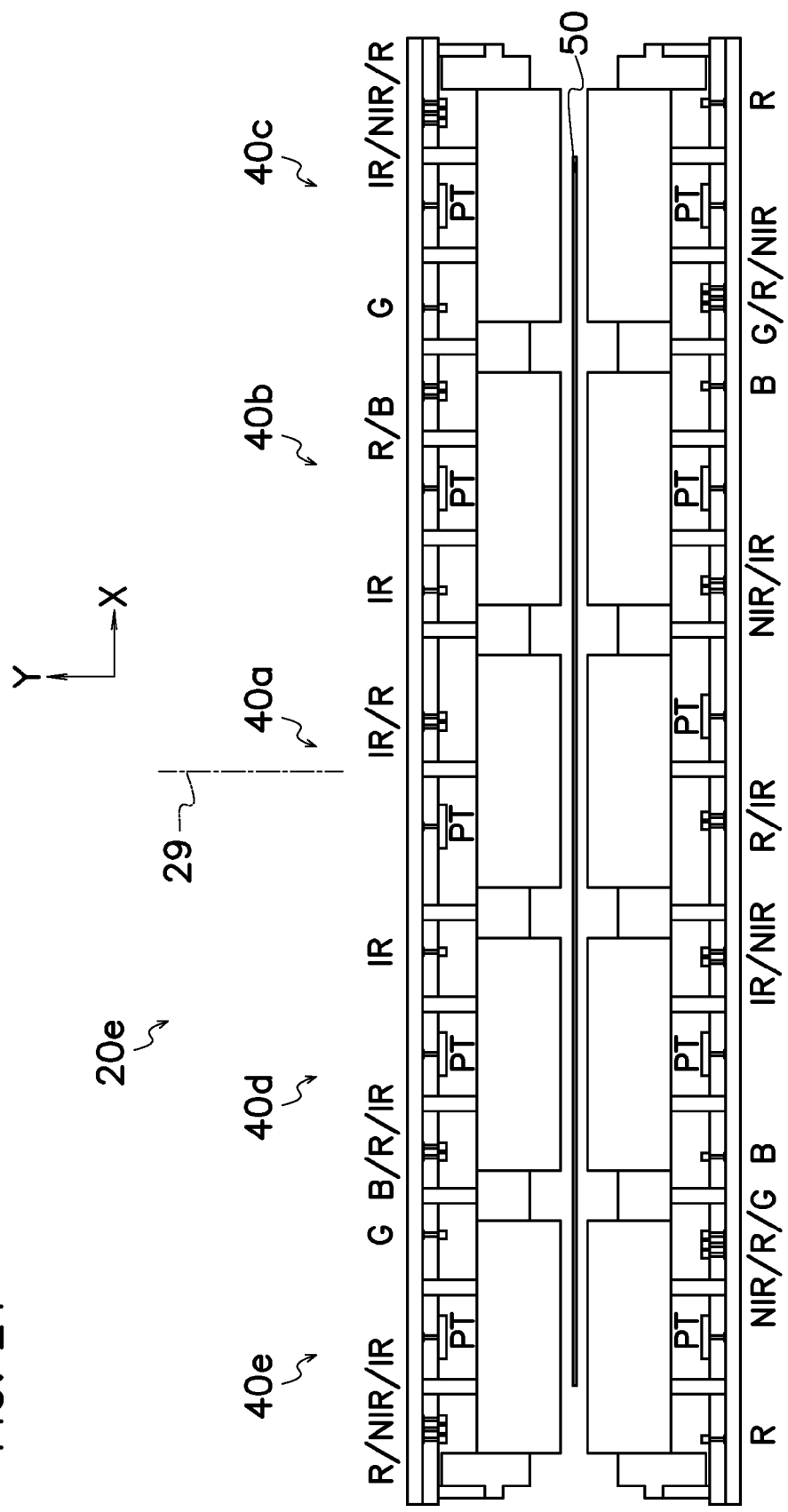
FIG. 21 is a longitudinal section view showing an embodiment of the document photosensor according to the present invention comprising five optical sensor devices having respectively four, six, eight and ten optical elements.

A further embodiment of the sensor device 20d shown in FIG. 20 comprises a central document photosensor 30a with ten optical elements, two right and left side document photosensors 30b, 30c each with ten optical elements on either side of central document photosensor 30a all disposed in a line along X axis. Central document photosensor 30a comprises first to fourth upper and lower LED chips 21 to 24 and 31 to 34 disposed as in document photosensor 10i shown in FIG. 11. Right side document photosensor 30b comprises first to fourth upper and lower LED chips 21 to 24 and 31 to 34 disposed as in document photosensor 10j shown in FIG. 12. Left side document photosensor 30c has an inverted structure of right side document photosensor 30b about central document photsensor 30a wherein each chip is disposed in a symmetric position regarding first to fourth upper and lower LED chips 21 to 24, 31 to 34 and upper and lower PD chips 37, 38 in document photosensor 10j shown in FIG. 12.

First to fourth upper and lower LED chips 21 to 24 and 31 to 34 in each document photosensor 30*a*, 30*b*, 30*c* are turned on at different points in time. Also, although LED chips 21 to 24 and 31 to 34 in each document photosensor 30*a*, 30*b*, 30*c* are turned on at a time, upper and lower partitions 43, 44 for separating between adjoining document photosensors 30*a*, 30*b*, 30*c* effectively prevent simultaneous detection of plural light by upper and lower PD chips 37, 38.

Upper and lower LED chips 21 to 24 and 31 to 34 produce lights of bilaterally symmetrical wavelength about a central vertical axis 29 of central document photosensor 30*a*. This LED chip array enables to pick out same transmitted light pattern data independently of right side up or bottom side up insertion of bill 50 into passageway 55 of bill validator because lights of same wavelength penetrate and scan substantially the same positions in bill 50 from upside or downside in mirror image. For example, if inverted bill 50 is inserted into passageway 55, lights of same wavelength are irradiated onto bill 50 from the upper and lower sides.

The sensor device 20*d* shown in FIG. 20 is advantageous in comparing prior art optical sensor device 111 shown in FIG. 22 because sensor device 20*d* may improve validation performance with increased number of LED chips capable of radiating lights of different wavelength and also reduce number of expensive PD chips to cut down on cost for manufacture. Control device decides a total amount of received lights by adding amounts of first to third lights that are irradiated from first to third upper LED chips 21 to 23 penetrated through bill 50 and received by lower PD chip 38. Then, control device calculates ratio of received amounts of first to third lights to the total amount, and decides bill 50 as genuine when each quotient is within a predetermined range.

As in upper sensor assembly 1, in lower sensor assembly 2, control device decides a total amount of received lights by adding amounts of fourth to sixth lights that are irradiated from first and second lower LED chips 31 to 33, penetrated through bill 50 and received by upper PD chip 37. Then, control device calculates ratio of received amounts of fourth to sixth lights to the total amount, and decides bill 50 as genuine when each quotient is within a predetermined range. In this way, control device decides bill 50 as genuine when ratio of received amount of first to sixth lights to total amount is within a predetermined range to transmit bill 50 to a stacking chamber.

In the sensor device 20*d* shown in FIG. 20, when fourth upper and lower LED chips 24, 34 irradiate seventh and eighth lights which are reflected on bill 50 and received by upper and lower PD chips 37, 38, control device may compare amount of seventh and eighth lights received by upper and lower PD chips 37, 38 with predetermined levels to decide a kind of inserted bill 50.

The sensor device may comprise any combination of optical elements selected from the group of four, six, eight and ten optical elements apposed along X axis. A still further embodiment of the sensor device 20*e* shown in FIG. 21 comprises a central document photosensor 40*a* with six optical elements, two right central and end document photosensors 40*b*, 40*c* with respectively eight and ten optical elements, and two left central and end document photosensors 40*d*, 40*e* with respectively eight and ten optical elements all disposed in a line along X axis.

Central document photosensor 40*a* comprises first to fourth upper and lower LED chips 21, 22 and 31, 32 disposed as in document photosensor 10*d* shown in FIG. 6. Right central document photosensor 40*b* comprises first to third upper and lower LED chips 21 to 23 and 31 to 33 disposed as in document photosensor 10*f* shown in FIG. 8. Right end document photosensor 40*c* comprises first to fourth upper and lower LED chips 21 to 24 and 31 to 34 disposed as in document photosensor 10*j* shown in FIG. 12. Left central document photosensor 40*d* has an inverted structure of right central document photosensor 40*b* about central document photsensor 40*a* wherein each chip is disposed in a symmetric position regarding first to third upper and lower LED chips 21 to 23, 31 to 33 and upper and lower PD chips 37, 38 in document photosensor 10*f* shown in FIG. 8. Left end document photosensor 40*e* has an inverted structure of right end document photosensor 40*c* about central document photosensor 40*a* wherein each chip is disposed in a symmetric position regarding first to fourth upper and lower LED chips 21 to 24, 31 to 34 and upper and lower PD chips 37, 38 in document photosensor 10*j* shown in FIG. 12.

Upper and lower LED chips 21 to 24 and 31 to 34 produce lights of bilaterally symmetrical wavelength about a central vertical axis 29 of central document photosensor 40*a*. This LED chip array enables to pick out same transmitted light pattern data independently of right side up or bottom side up insertion of bill 50 into passageway 55 of bill validator because lights of same wavelength penetrate and scan substantially the same positions in bill 50 from upside or downside in mirror image. For example, if inverted bill 50 is inserted into passageway 55, lights of same wavelength are irradiated onto bill 50 from the upper and lower sides. In sensor device 20*e* shown in FIG. 21, fourth upper and lower LED chips 24, 34 in right and left end document photosensors 40*c*, 40*e* irradiate lights that are reflected on bill 50 to utilize these lights for decision on kind of bill, and all other lights may be used to validate bill 50 that are irradiated from LED chips 21 to 23 and 31 to 33 and penetrated through bill 50.

Light data of lights transmitted through bill 50 is used to detect for example each quality in ink on front and back surfaces, paper quality and thickness of bill 50, and so, bill validators for discriminating highly counterfeited notes typically utilize transmitted light data rather than reflected light data of bills. Also, it is possible to detect three or more kinds of transmitted light data from a same area of bill 50 and validate elaborately forged notes with high accuracy. However, data of lights reflected on bill 50 may be used for validation by detecting by lower and upper PD chips 38 and 37 lights irradiated from first to third upper and lower LED chips 21 to 23 and 31 to 33 and reflected on bill 50. Alternatively, authenticity of bill 50 may be decided by detecting by lower and upper PD chips 38 and 37 in light receiving chamber 58 lights irradiated from fourth upper and lower PD chips 38 and 37 lights irradiated from fourth upper and lower LED chips 24 and 34 and penetrated through bill 50. Moreover, kind of bill 50 may be identified by detecting lights radiated from first to fourth upper and lower LED chips 21 to 24 and 31 to 34 and penetrated through bill 50.

During transportation through passageway 55 of bill 50 inserted into inlet 101 of bill validator, it is brought nearly into alignment with a longitudinal central line of or into contact to side walls of passageway 55 by means of a centralizing device not shown. In this way, as bill 50 is moved along longitudinal central line of passageway 55 and in alignment with each longitudinal line of the above-mentioned document photosensors 10*a* to 10*j* and sensor devices 20*a* to 20*e*, lights released from LED chips 21 to 24 and 31 to 34 are always irradiated onto substantially the same areas of bill 50 in width. Accordingly, in embodiments of document photosensors 10*a* to 10*j* and sensor devices 20*a* to 20*e* with LED chips symmetrically arranged each other for generating lights of same wavelength, they can pick out same transmitted light pattern data independently of right side up or bottom side up insertion of bill 50 into passageway 55 of bill validator because lights of same wavelength penetrate and scan substantially the same positions in bill 50 from upside or downside in mirror image.

To achieve a modern bill validation for detecting multi-colored transmitted light data from a number of microscopic regions of bill to accurately determine on whether differences or ratios between lights of different wavelength are within a predetermined reference range, bill validators need to have surface-mounted light emitting and receiving elements. In this case, LED chips are mounted on same or adjoining discrete support electrodes or terminals on a substrate to cover these LED chips together or at once with a same protective resin. When LED chips are mounted on a same electrode on substrate to connect each anode or cathode electrode of LED chips to a same support electrode, a metallic line (bonding wire) may be used that connects each cathode or anode electrode of LED chips to a discrete or same support electrode on substrate. Protective resin for use in surface mounting does not perform light-converging or diverging action without pseudo-lighting of an LED chip even when an adjoining LED chip is turned on. Pitch distance between adjoining LED chips may be 1 mm or less, preferably 0.6 mm or less to perfectly diffuse, disperse or scatter lights of different wavelength irradiated from LED chips within a diffusion chamber, and then lights are irradiated as linear light beams onto essentially the same areas of bill through aspheric lenses to detect them by PD chips thereby resulting in multi-colored light data from the same areas of bill. These arrangement and diffusion chamber are free from plastic and light-focusing encapsulants for sealing LED chips and outer leads extended from encapsulants.

In embodiments of the present invention shown in FIGS. 6 through 12, first and second light emitting elements 21, 22 each having two terminals are surface-mounted on same or different emission electrodes 71 on substrate 11, and a diffusion chamber 53 is formed between first and second light emitting elements 21, 22 and aspheric lens 51. Light emitting elements 21, 22 are coated together with a same light-transmissive or -permeable protective resin. Light receiving element 37 having two terminals is surface-mounted on acceptance electrode 81 of substrate 11 to gather lights on light receiving element 37 through aspheric lenses 51, 52. Otherwise, acceptance electrode 81 may be formed on another substrate 12 disposed opposite to substrate 11 to surface-mount on acceptance electrode 81 light receiving element 37 having two terminals. First and second light emitting elements 21, 22 may be surface-mounted on same or different adjoining discrete emission electrodes 71 in a spaced relation to each other on substrate 11 by a pitch distance of 1 mm or less, preferably 0.6 mm or less.

When first and second LED chips 21, 22 are turned on, lights are emitted from their PN junction in the radial direction, and after diffused within diffusion chamber 53, lights are projected on document 50 after transmission through aspheric lens 51. Lights are converted through aspheric lens 51 into linear light beams of generally rectangular or ellipse section to compensate difference in actually mounted positions of first and second LED chips 21, 22 so that a same effect may be obtained as in the case first and second LED chips 21, 22 are on the same position of substrate 11. Lights reflected on document 50 may be detected by PD chip 37 in light receiving chamber 58 through aspheric lens 51. Lights irradiated from first and second LED chips 21, 22 pass through diffusion chamber 53 without plastic deterioration by light irradiation as in shell-shaped LEDs.

Reflective surfaces 54 (FIG. 6) may be formed in brackets 41, 42 for surrounding first and second LED chips 21, 22 to reflect lights therefrom toward aspheric lenses 51, 52, and therefore reflective surfaces 54 may define a part of diffusion chamber 53. As shown by dotted lines in FIG. 6, reflective surfaces 54 are inclined or tapered, increasing section area of diffusion chamber from first and second LED chips 21, 22 toward aspheric lens 52. Reflective surfaces 54 are formed into frustro-etrosa shape such as frustro-conical or -pyramid shape to effectively increase the amount of reflected lights on brackets 41, 42 toward PD chips 37, 38.

The foregoing embodiments of the prevent invention may be modified in various ways. For example, light data reflected on bill 50 may be collected by means of upper and lower first to third LED chips 21 to 23 and 31 to 33 in four, six and eight optical elements. Sensor assemblies may comprise six or more optical elements with increased number of LED chips, and may comprise more than two PD chips.

First to fourth upper and lower LED chips 21 to 24 and 31 to 34 may be disposed in two or more rows perpendicular to longitudinal direction of passageway 55. In this case, third and fourth or more array line may be set in parallel to first and second array lines 56, 57. Five or more LED chips and PD chips may be provided in respectively sensor devices 1, 2. Five or less upper and lower sensor assemblies 1 and 2 are desirable, however, the number of sensor assemblies does not limit the present invention. Upper and lower sensor assemblies of same number may preferably be arranged in alignment with first and second array lines 56, 57, however, this structure does not mean any limitation to the present invention.

In the shown embodiments, first and second array lines 56, 57 are set in parallel to passageway 55 of bill 55, however, a plane including first and second array lines 56, 57 may be set perpendicularly to or on a slant at an angle less than 45 degrees.

APPLICABILITY IN INDUSTRY

The present invention is widely applicable to optical sensors for use in document photosensors such as bill handling apparatuses, bill validators, bill discriminators and coupon acceptors.

The following enumerates the embodiments according to the present invention:

(1) The document photosensor of claim 1, further comprising a sensor assembly (1, 2) disposed on one side of a passageway (55) along which a document (50) is transported, wherein the sensor assembly (1, 2) has the substrate (11, 12), (2) The document photosensor of claim 1, wherein the partition (43, 44) of the bracket (41) is fit in an opening (11a) formed in the substrate (11, 12).

(3) The document photosensor of the above (1), wherein the sensor assembly (1, 2) is mounted on a base plate (13, 14) with conductive leads (61) electrically connected to a plurality of upper terminals (63) formed on the base plate (13, 14).

(4) The document photosensor of claim 1, wherein the substrate (11, 12) has an upper substrate (11) disposed on one side of a passageway (55) along which a document (50) is transported and a lower substrate (12) disposed on the opposite side of the passageway (55) from the upper substrate (11), the bracket (41, 42) has an upper bracket (41) disposed on the upper substrate (11) for forming an upper light diffusion chamber (53) and an upper light receiving chamber (58) separated from each other, and a lower bracket (42) disposed on the lower substrate (12) for forming a lower light diffusion chamber (53) and a lower light receiving chamber (58) separated from each other, the light emitting element (21, 31) has an upper light emitting element (21) surface-mounted on the upper substrate (11) in the upper light diffusion chamber (53), and a lower light emitting element (31) surface-mounted on the lower substrate (12) in the lower light diffusion chamber (53), the light receiving element (37, 38) has an upper light receiving element (37) surface-mounted on the upper substrate (11) in the upper light receiving chamber (58) and a lower light receiving element (38) surface-mounted on the lower substrate (12) in the lower light receiving chamber (58).

(5) The document photosensor of the above (4) further comprising: an upper aspheric lens (51) disposed in a spaced relation by a certain distance to the upper light emitting and receiving elements (21, 37), and a lower aspheric lens (52) disposed in a spaced relation by a certain distance to the lower light emitting and receiving element (31, 38).

(6) The document photosensor of claim 4, wherein the bracket (41, 42) comprises a reflective wall (54) in the light diffusion chamber (53), the reflective wall (54) has an inclined surface with the increasing section area toward the outside from the light emitting element (21, 22).

(7) The document photosensor of claim 1, further comprising a light-transmissive protective resin of same material for covering the light emitting element (21, 22).

What is claimed are:

1. A document photosensor comprising: a substrate, a bracket disposed on the substrate for forming a light diffusion chamber and a light receiving chamber separated from each other, a light emitting element surface-mounted on the substrate in the light diffusion chamber, and a light receiving element surface-mounted on the substrate in the light receiving chamber.

2. The document photosensor of claim 1, wherein a light emitted from the light emitting element passes the light diffusion chamber, is reflected on a document moved along a passageway, and then is received by the light receiving element in the light receiving chamber.

3. The document photosensor of claim 1, wherein the light emitting element has one terminal secured on and electrically connected to an emission electrode formed on the substrate, the light receiving element has one terminal secured on and electrically connected to an acceptance electrode, the emission electrode and acceptance electrode are deployed in alignment on an array line perpendicular to a moved direction of the document in the passageway.

4. The document photosensor of claim 1, further comprising an aspheric lens supported on the bracket opposite to the light emitting and receiving elements.

5. The document photosensor of claim 4, wherein a light emitted from the light emitting element passes the light diffusion chamber and aspheric lens, is reflected on a document moved along a passageway, passes the aspheric lens and then is received by the light receiving element in the light receiving chamber.

6. A document photosensor comprising: a substrate, a bracket disposed on the substrate for forming a light diffusion chamber and a light receiving chamber separately from each other, first and second light emitting elements surface-mounted on the substrate in the light diffusion chamber, and a light receiving element surface-mounted on the substrate in the light receiving chamber.

7. The document photosensor of claim 6, wherein lights emitted from the first and second light emitting elements pass the light diffusion chamber, are reflected on a document moved along a passageway, and then are received by the light receiving element in the light receiving chamber.

8. The document photosensor of claim 6, further comprising an aspheric lens supported on the bracket opposite to the first and second light emitting elements and light receiving element.

9. The document photosensor of claim 8, wherein lights emitted from the first and second light emitting elements pass the light diffusion chamber and aspheric lens, are reflected on a document, pass the aspheric lens and then are received by the light receiving element in the light receiving chamber.

10. The document photosensor of claim 6, wherein a distance between the first and second light emitting elements are equal to or less than 0.6 mm.

11. A document photosensor comprising: a substrate, a bracket disposed on the substrate for forming a light diffusion chamber and a light receiving chamber separately from each other, first, second and third light emitting elements surface-mounted on the substrate in the light diffusion chamber, and a light receiving element surface-mounted on the substrate in the light receiving chamber.

12. The document photosensor of claim 11, wherein lights emitted from the first, second and third light emitting elements pass the light diffusion chamber, are reflected on a document moved along a passageway, and then are received by the light receiving element in the light receiving chamber.

13. The document photosensor of claim 11, further comprising an aspheric lens supported on the bracket opposite to the first, second land third light emitting elements and light receiving element.

14. The document photosensor of claim 13, wherein lights emitted from the first, second and third light emitting elements pass the light diffusion chamber, are reflected on a document moved along a passageway, and then are received by the light receiving element in the light receiving chamber.

15. The document photosensor of claim 1, 6 or 11, wherein the bracket has a partition for isolating between the light diffusion chamber and the light receiving chamber.

* * * * *